United States Patent
Kim et al.

(10) Patent No.: US 12,132,685 B2
(45) Date of Patent: Oct. 29, 2024

(54) METHOD FOR TRANSMITTING OR RECEIVING DATA IN WIRELESS COMMUNICATION SYSTEM, AND APPARATUS THEREFOR

(71) Applicant: LG ELECTRONICS INC., Seoul (KR)

(72) Inventors: Kyuseok Kim, Seoul (KR); Hyungtae Kim, Seoul (KR); Jiwon Kang, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 432 days.

(21) Appl. No.: 17/593,966

(22) PCT Filed: Mar. 30, 2020

(86) PCT No.: PCT/KR2020/004350
§ 371 (c)(1),
(2) Date: Feb. 16, 2022

(87) PCT Pub. No.: WO2020/204540
PCT Pub. Date: Oct. 8, 2020

(65) Prior Publication Data
US 2023/0291531 A1    Sep. 14, 2023

(30) Foreign Application Priority Data
Mar. 29, 2019  (KR) .................. 10-2019-0037377

(51) Int. Cl.
*H04W 72/04*    (2023.01)
*H04L 1/00*    (2006.01)
*H04L 5/00*    (2006.01)

(52) U.S. Cl.
CPC .......... *H04L 5/0091* (2013.01); *H04L 1/0003* (2013.01); *H04L 1/0061* (2013.01); *H04L 5/0035* (2013.01)

(58) Field of Classification Search
CPC ...... H04B 17/345; H04B 7/0417; H04B 7/06; H04L 1/0003; H04L 1/0009;
(Continued)

(56) References Cited

U.S. PATENT DOCUMENTS

| | | | |
|---|---|---|---|
| 8,625,554 B2* | 1/2014 | Zhang | H04B 7/0413 375/260 |
| 2012/0020264 A1* | 1/2012 | Lehti | H04L 1/0071 370/335 |

(Continued)

OTHER PUBLICATIONS

PCT International Application No. PCT/KR2020/004350 International Search Report dated Jul. 17, 2020, 5 pages.
(Continued)

*Primary Examiner* — Phuc H Tran
(74) *Attorney, Agent, or Firm* — LEE, HONG, DEGERMAN, KANG & WAIMEY

(57) ABSTRACT

The present invention provides a method for transmitting or receiving data in a wireless communication system, and an apparatus therefor. Specifically, a method for receiving data by a user equipment (UE) in a wireless communication system may comprise the steps of: receiving control information related to a first codeword and a second codeword; and on the basis of the control information, receiving the first codeword and the second codeword via a physical layer, wherein it is recognized on the basis of a pre-defined rule that the first codeword and the second codeword correspond to the same transport block within a higher layer of the physical layer.

16 Claims, 14 Drawing Sheets

(58) Field of Classification Search
CPC ... H04L 1/0031; H04L 1/0061; H04L 1/1614; H04L 1/1819; H04L 1/1822; H04L 1/1861; H04L 1/1893; H04L 1/1896; H04L 5/0035; H04L 5/0055; H04L 5/0091; H04W 72/04
See application file for complete search history.

(56) References Cited

U.S. PATENT DOCUMENTS

| | | |
|---|---|---|
| 2013/0051369 A1* | 2/2013 | Ko .................. H04L 1/0026 370/335 |
| 2019/0081750 A1 | 3/2019 | Yang et al. |
| 2019/0273576 A1* | 9/2019 | Zhang ............... H04L 1/0057 |
| 2020/0220665 A1* | 7/2020 | Sun .................. H04W 72/20 |

OTHER PUBLICATIONS

Qualcomm Incorporated, "Multi-TRP Enhancements," 3GPP TSG-RAN WG1 Meeting #96, R1-1903043, Feb.-Mar. 2019, 30 pages.
ETRI, "Potential PDCCH enhancements for NR URLLC," 3GPP TSG RAN WG1 Ad-Hoc Meeting 1901, R1-1900686, Jan. 2019, 6 pages.
NTT Docomo, Inc., "Enhancements on multi-TRP/panel transmission," 3GPP TSG RAN WG1 #96, R1-1902812, Feb.-Mar. 2019, 25 pages.
LG Electronics, "Enhancements on multi-TRP/panel transmission," 3GPP TSG RAN WG1 #96, R1-1902091, Feb.-Mar. 2019, 11 pages.

\* cited by examiner

[FIG. 1]
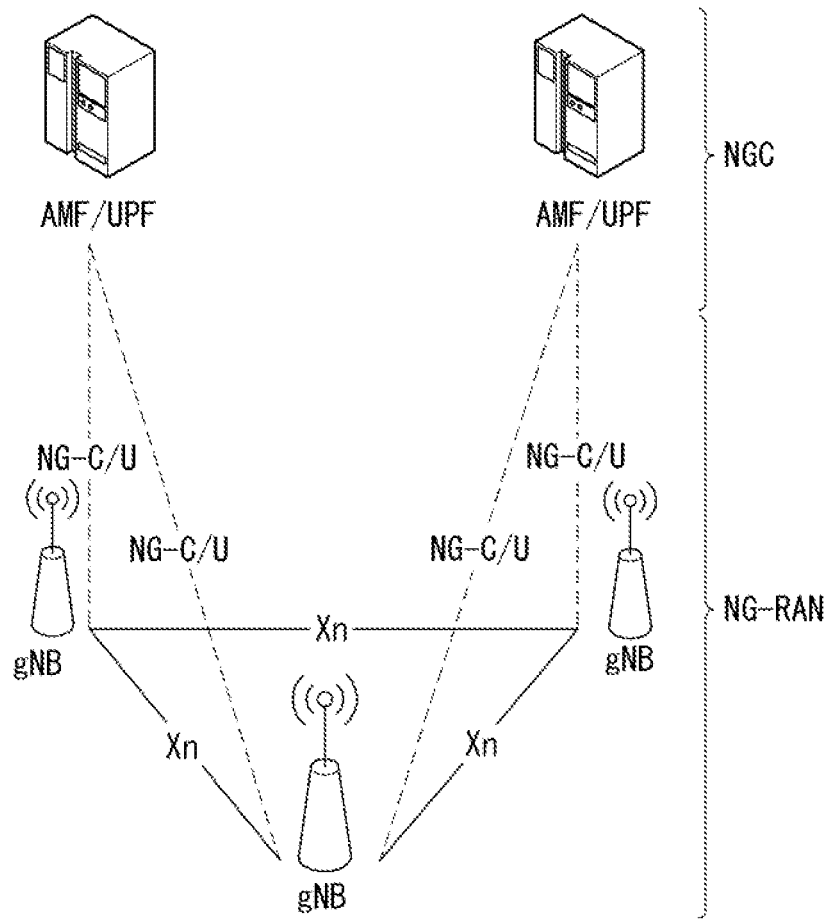
[FIG. 2]
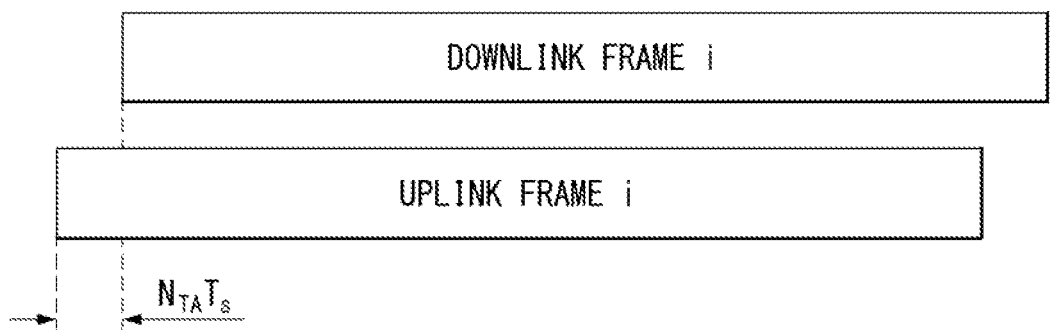

[FIG. 3]
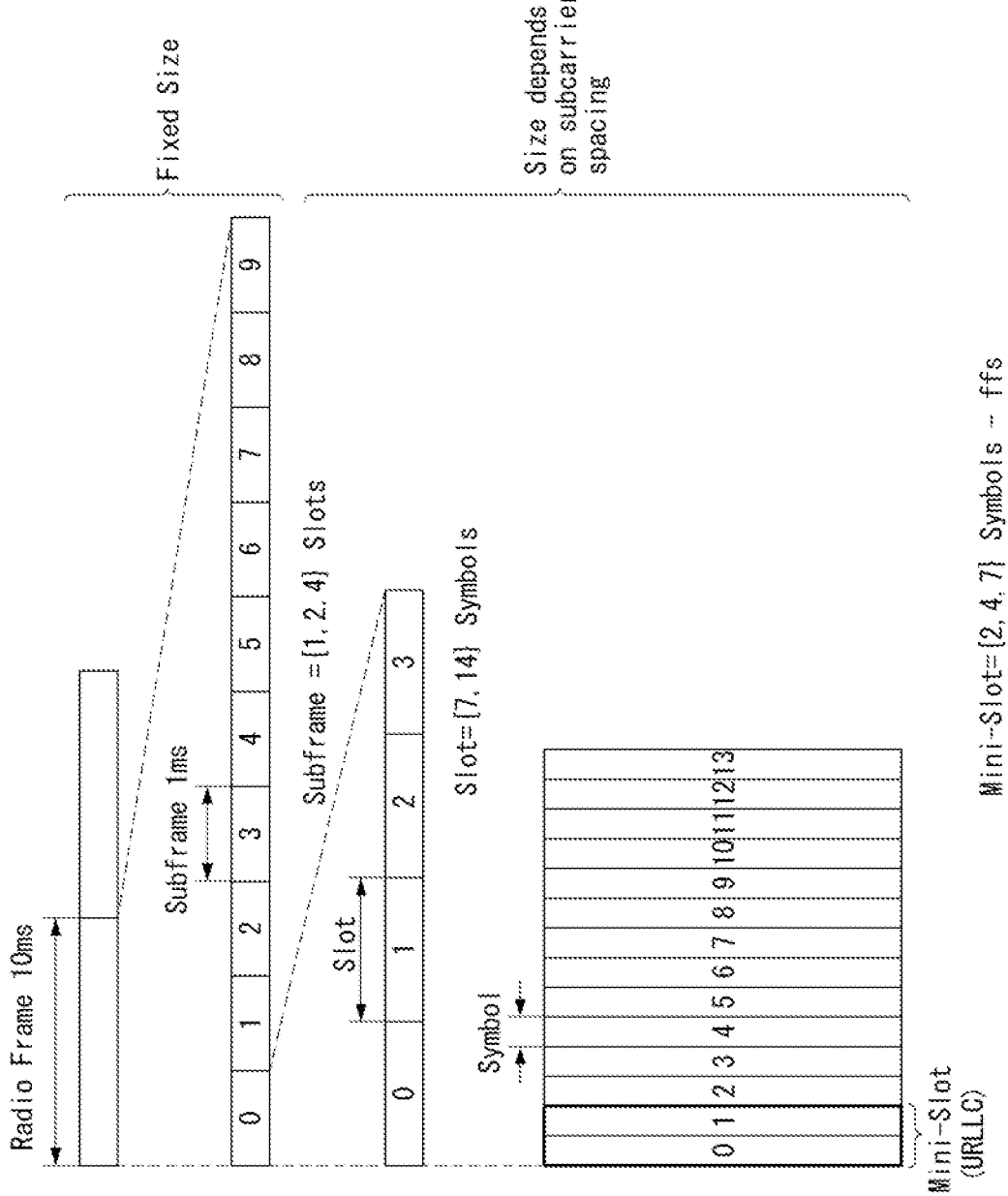

[FIG. 4]
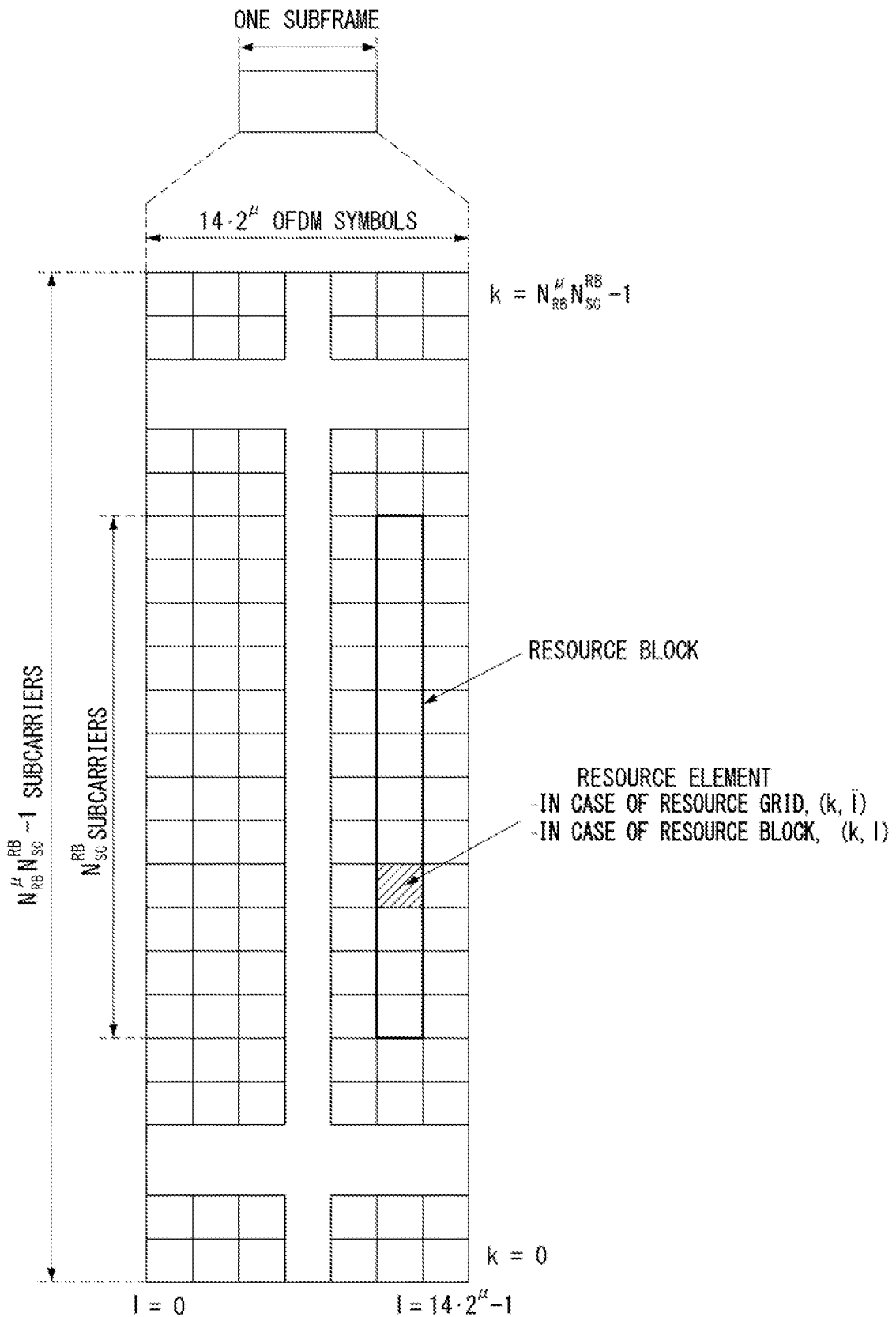

[FIG. 5]
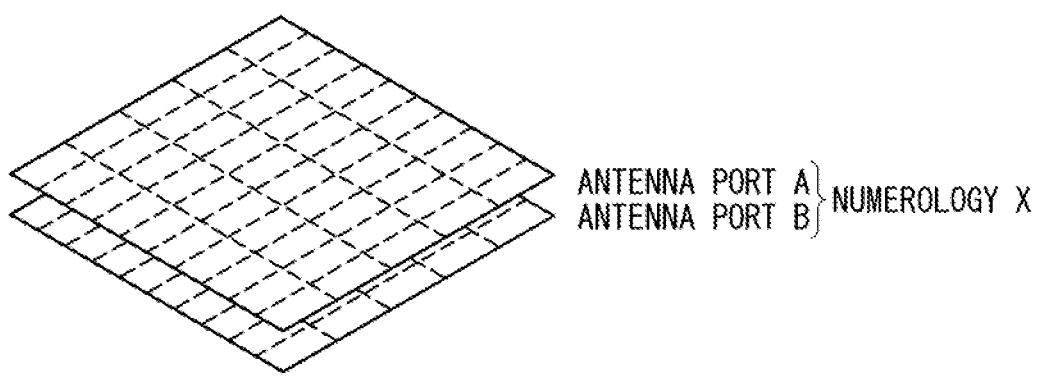
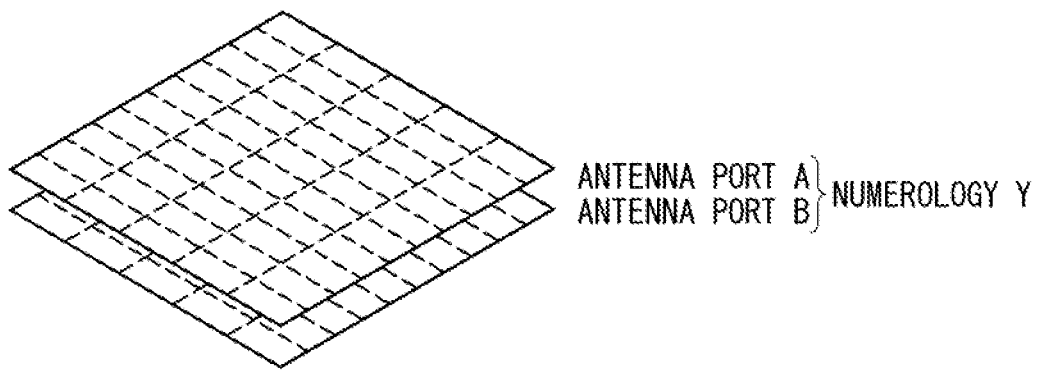

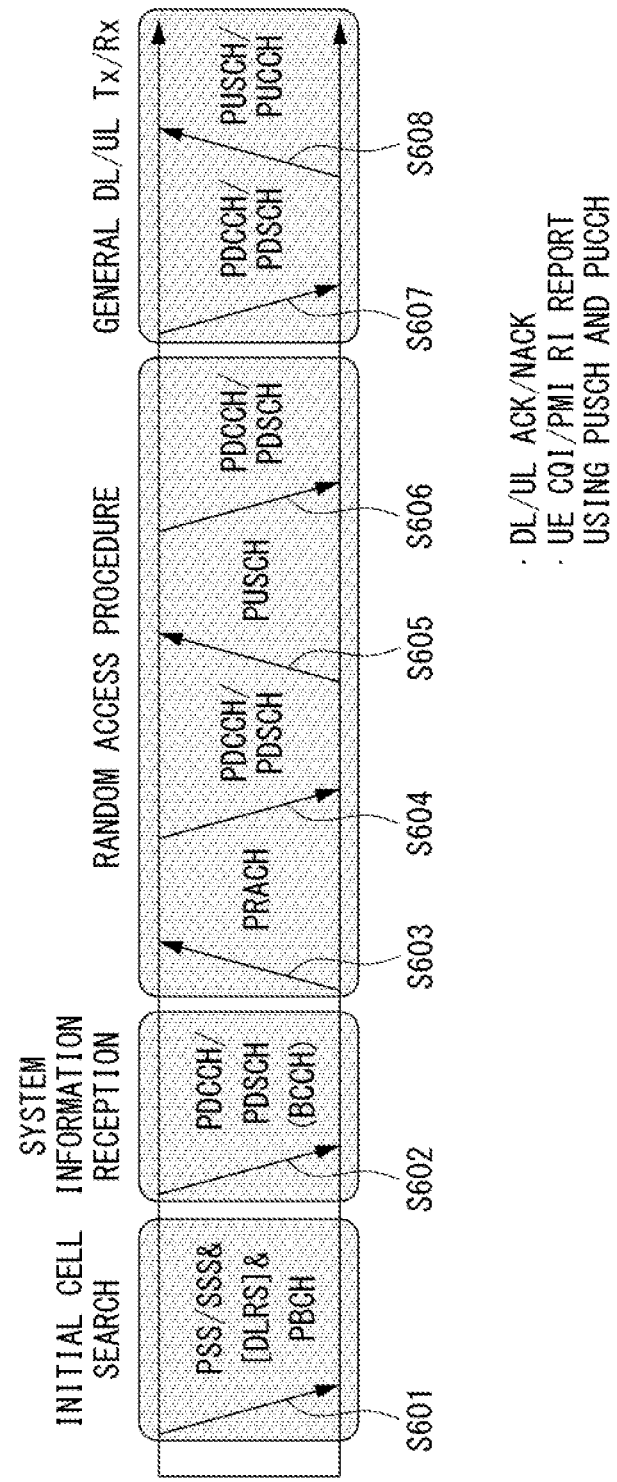
[FIG. 6]

[FIG. 7]
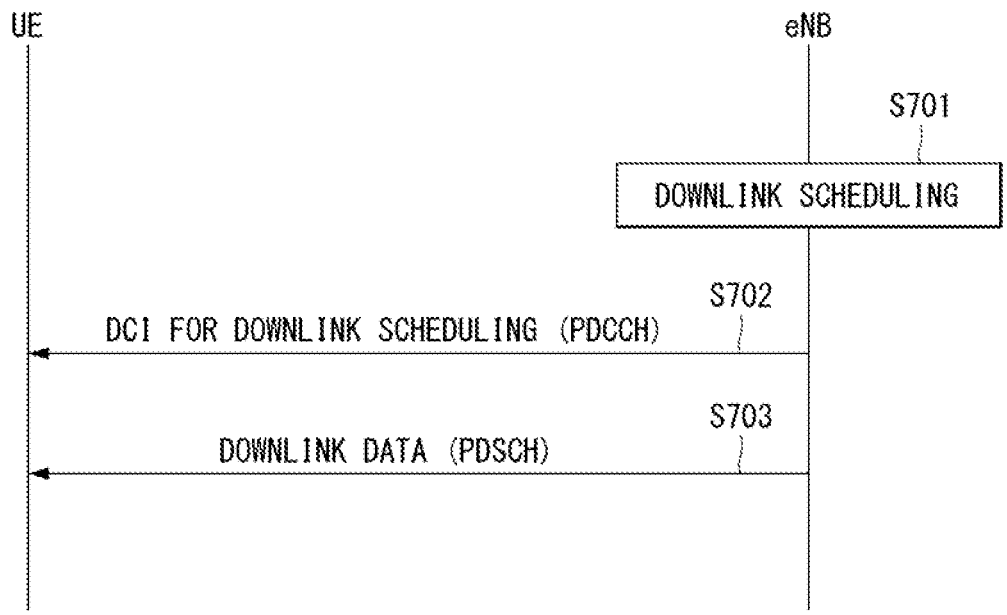
[FIG. 8]
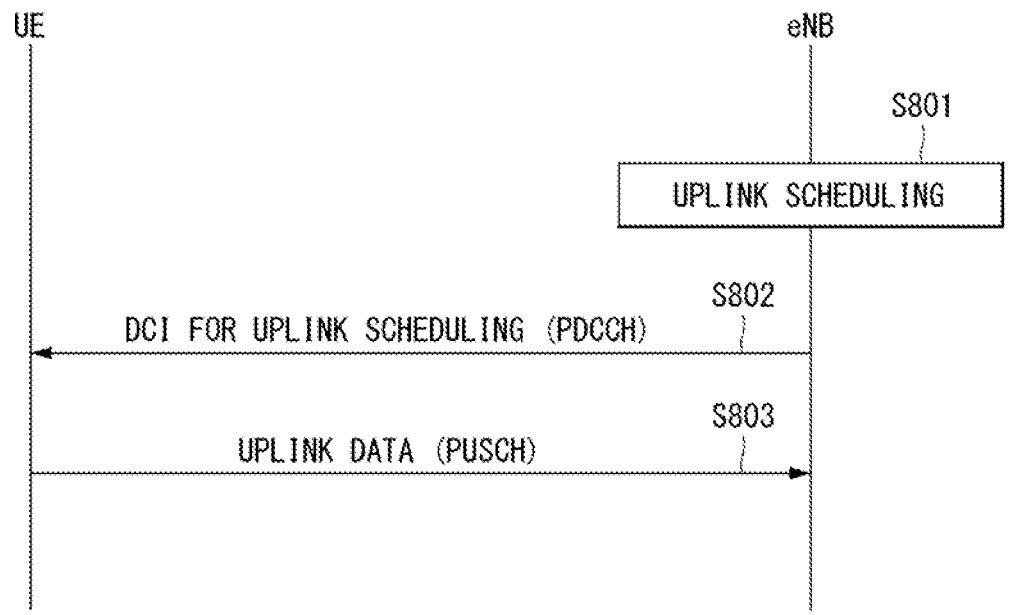

[FIG. 9]
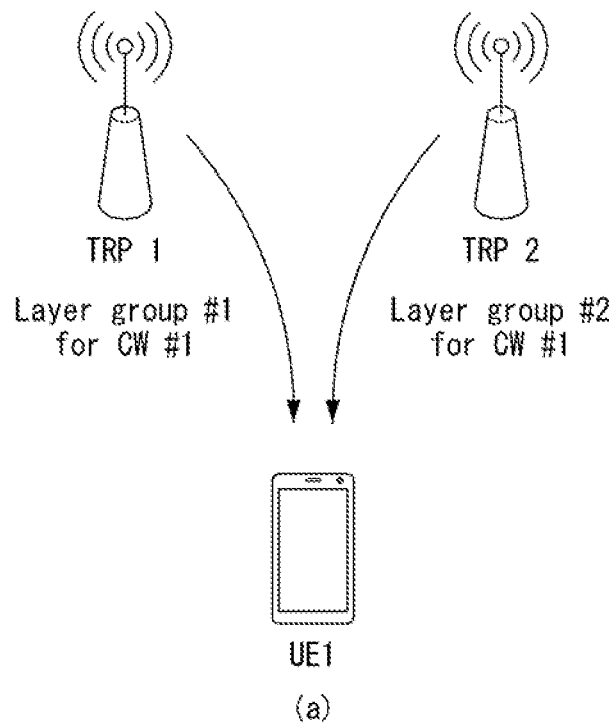
(a)
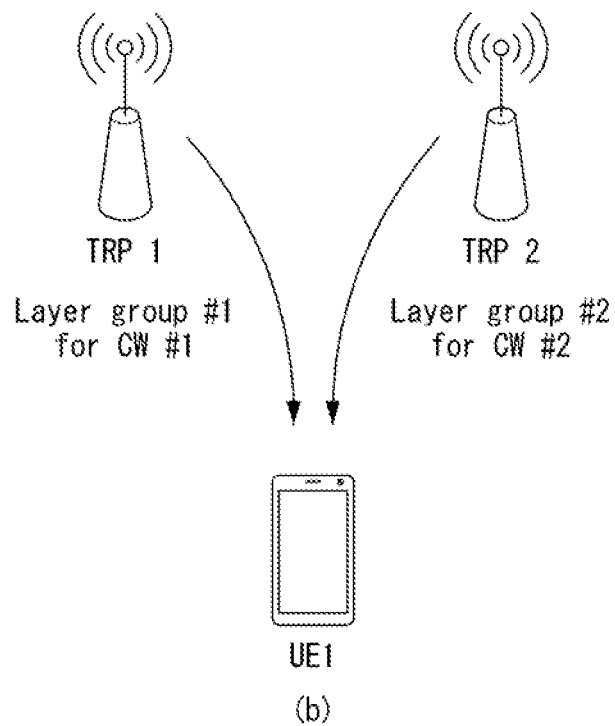
(b)

[FIG. 10]
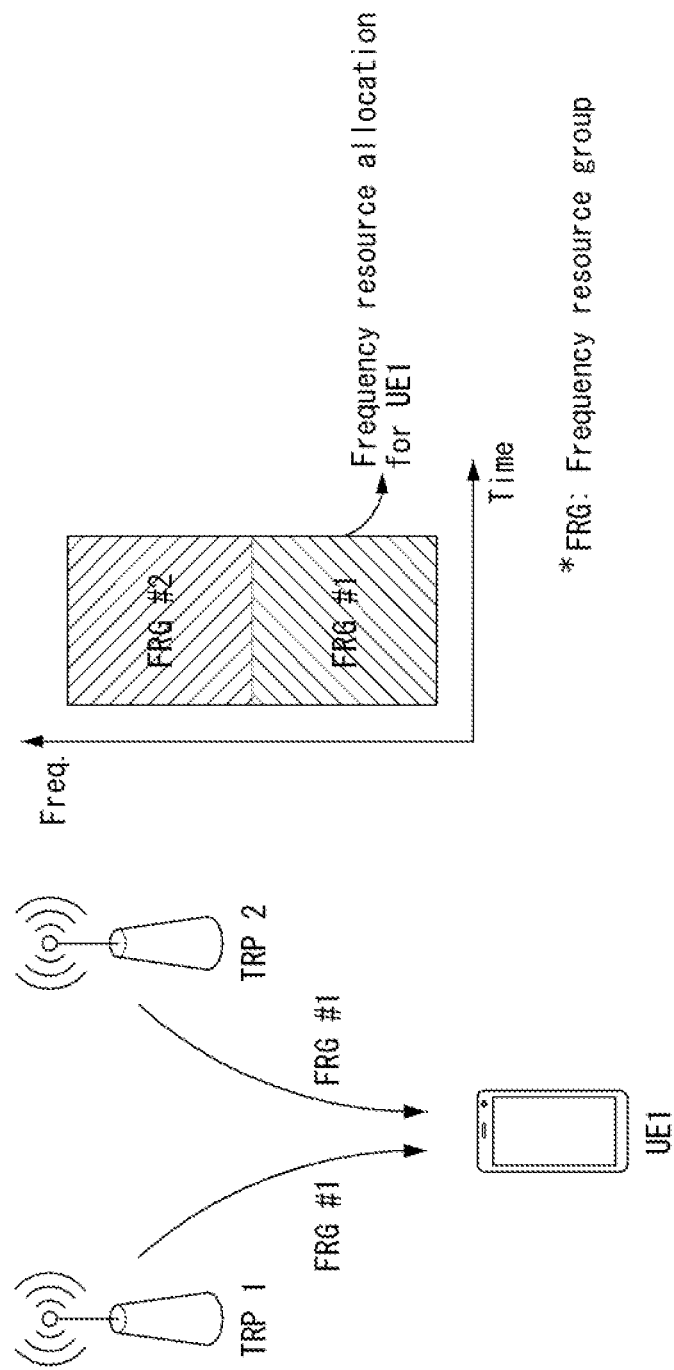

[FIG. 11]
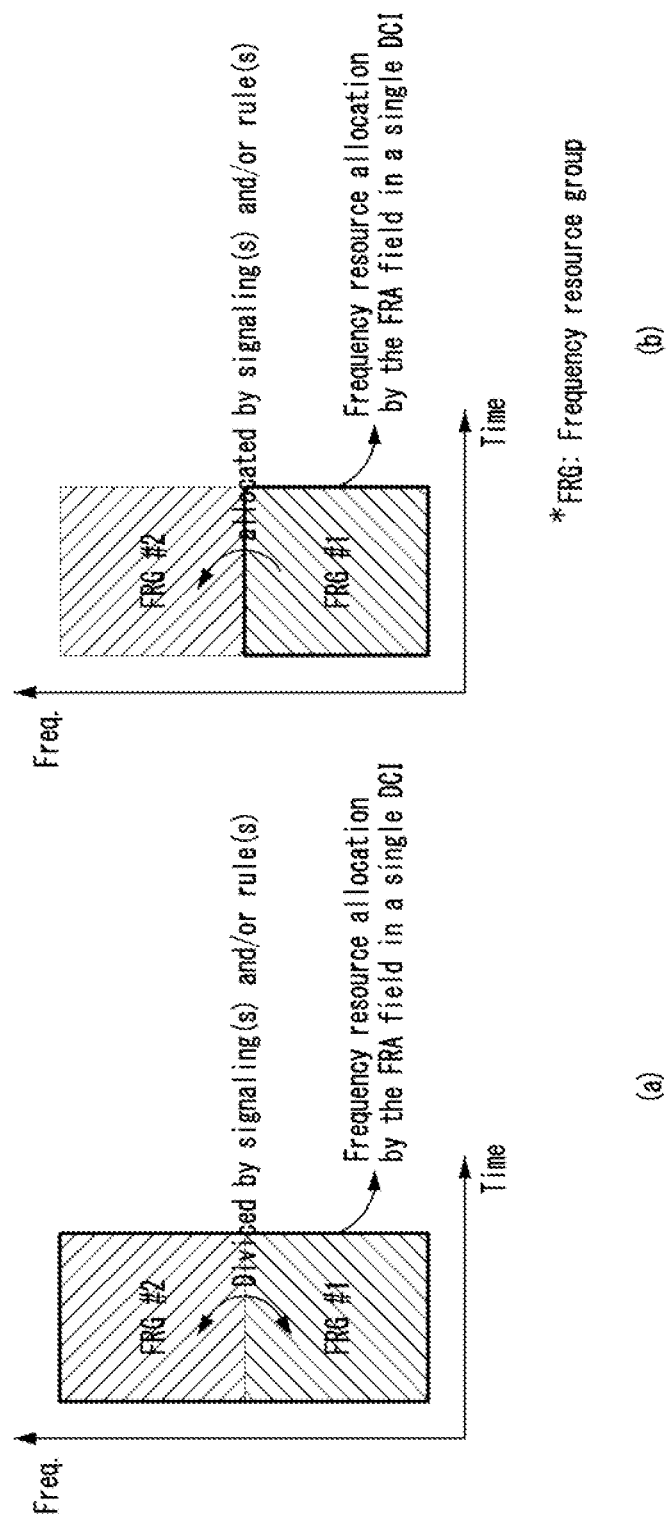

[FIG. 12]
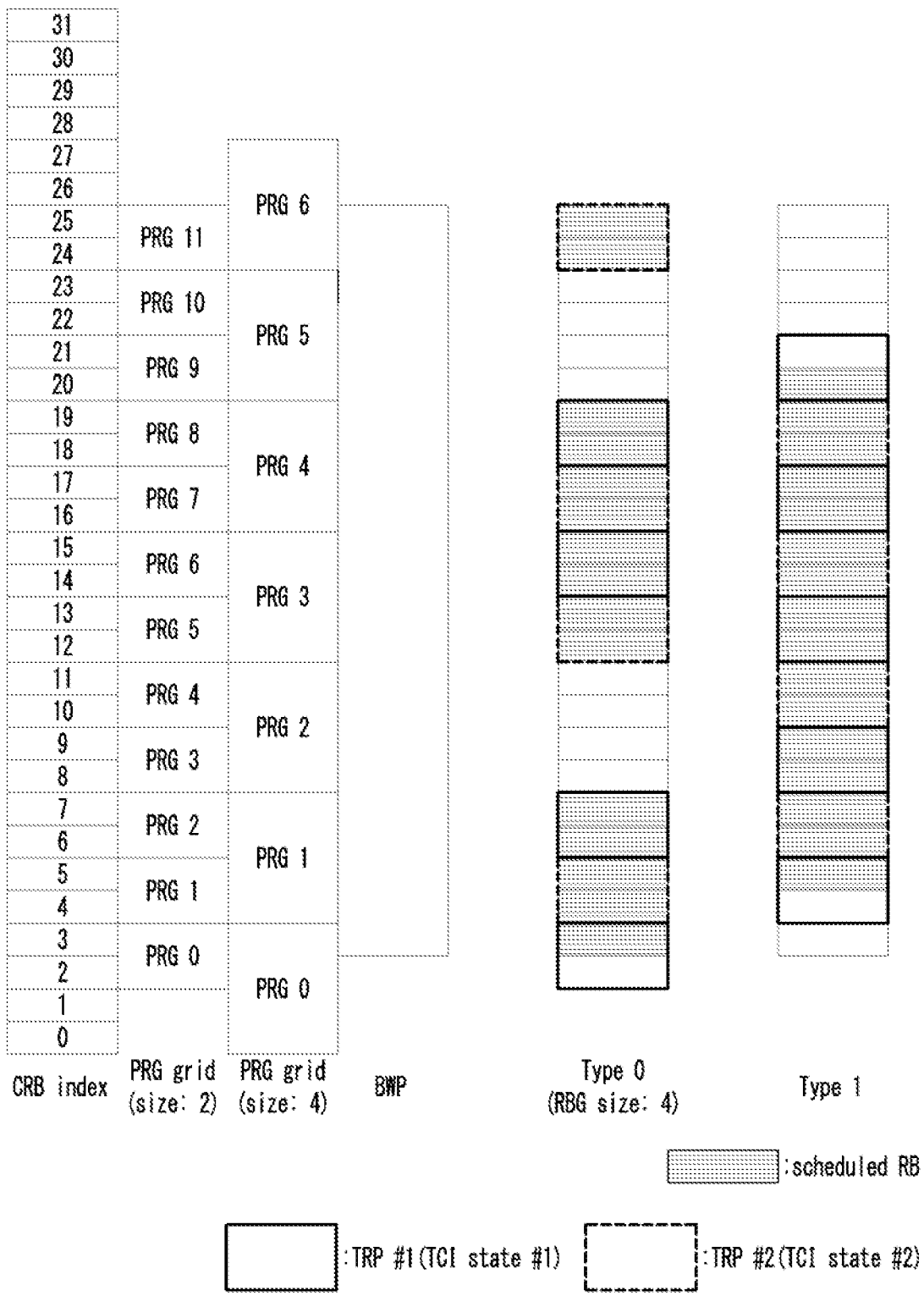

[FIG. 13]
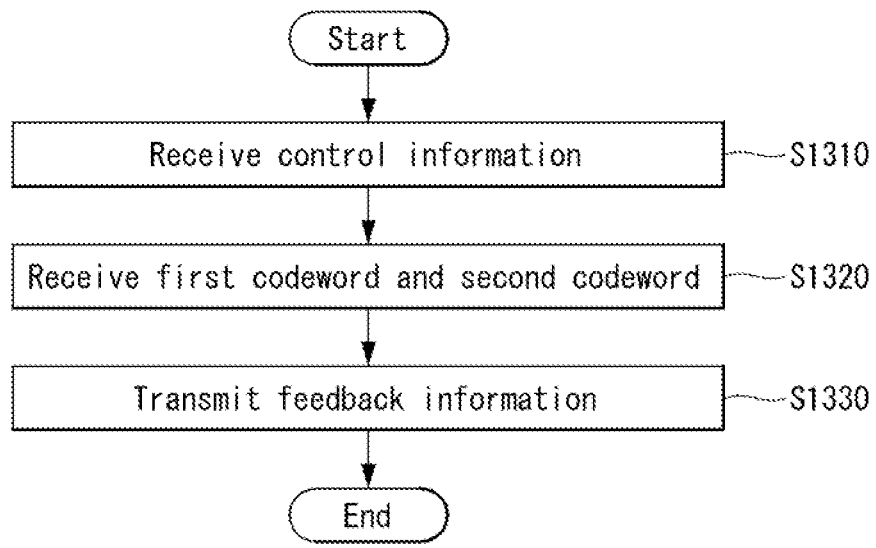
[FIG. 14]
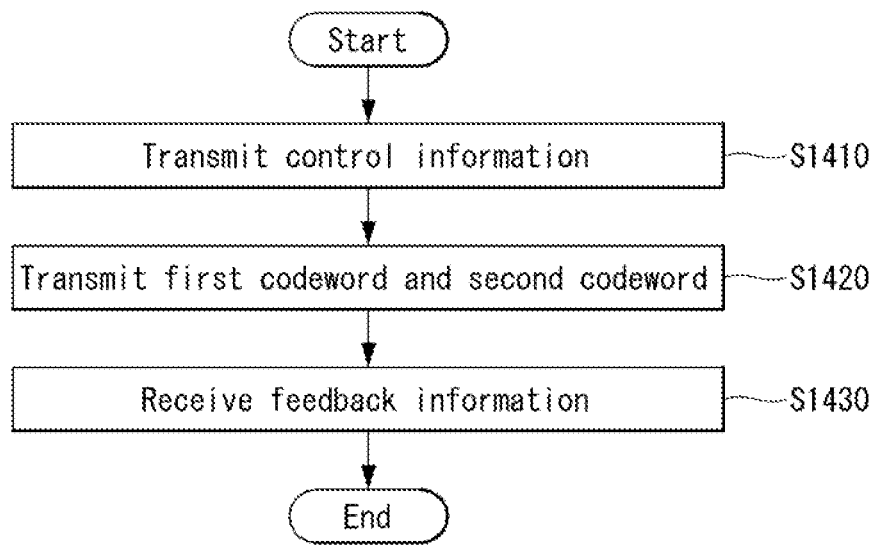

[FIG. 15]
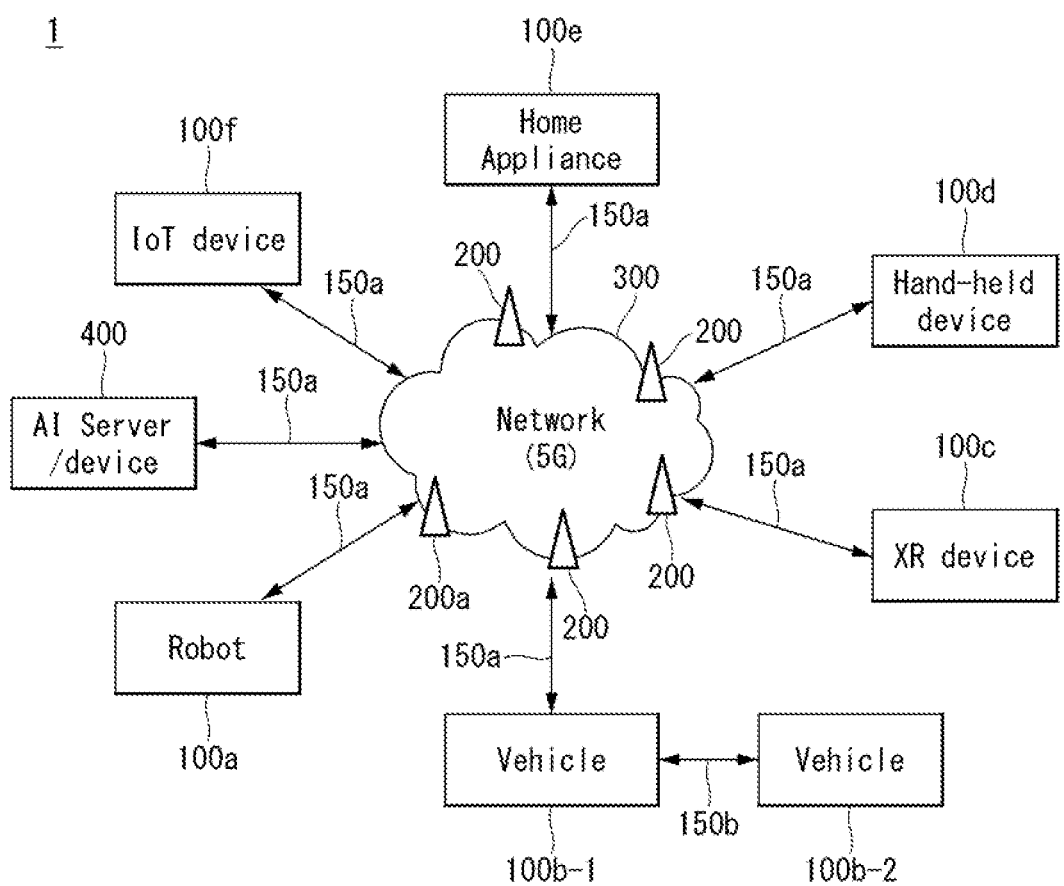

[FIG. 16]
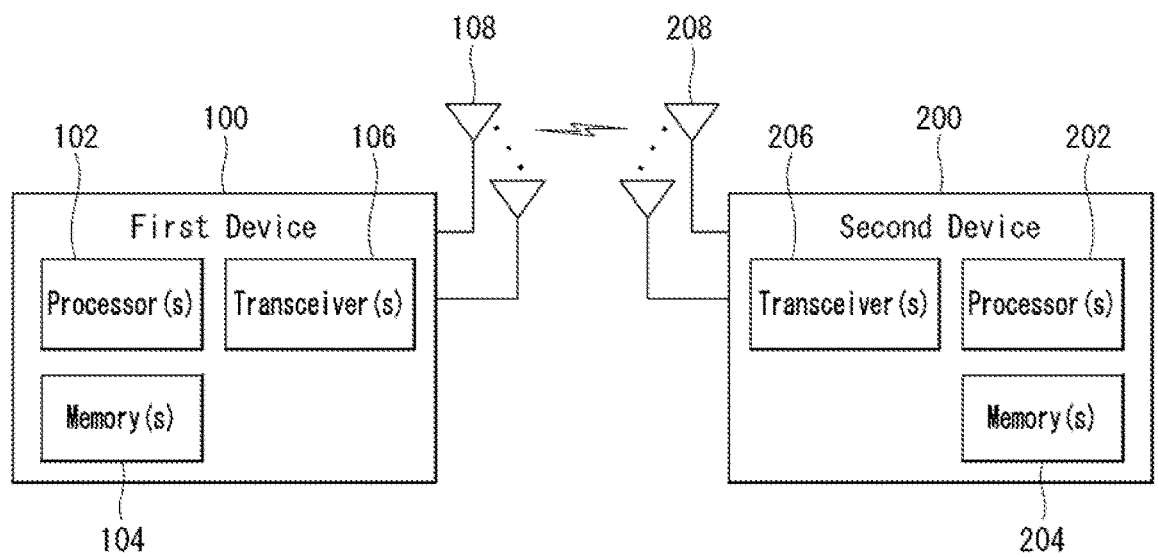
[FIG. 17]
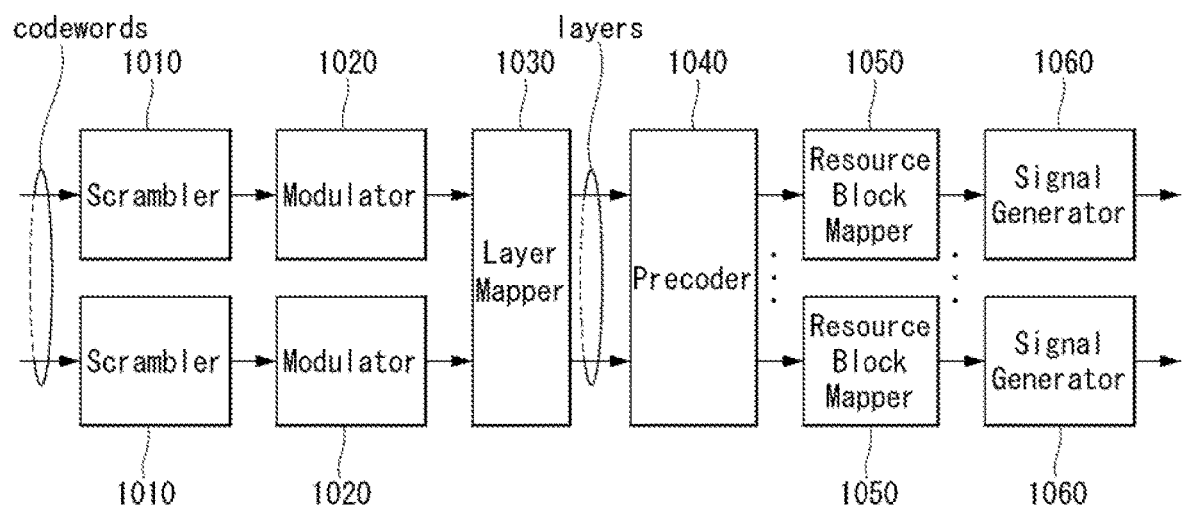

[FIG. 18]
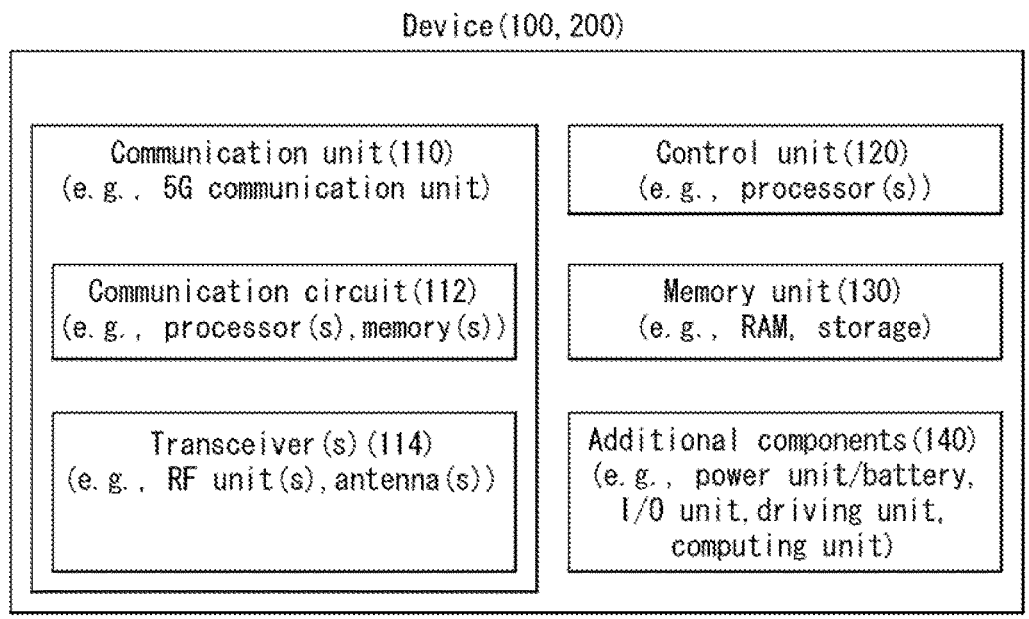
[FIG. 19]
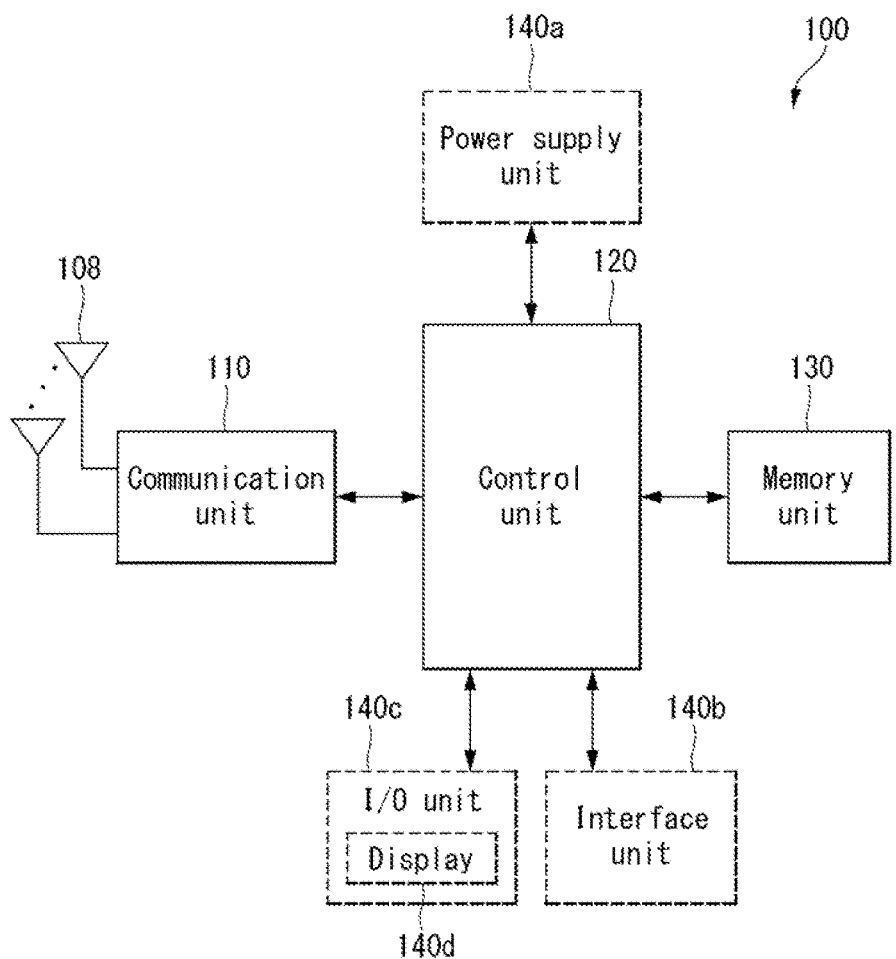

METHOD FOR TRANSMITTING OR RECEIVING DATA IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2020/004350, filed on Mar. 30, 2020, which claims the benefit of earlier filing date and right of priority to Korean Patent Application No. 10-2019-0037377, filed on Mar. 29, 2019, the contents of which are all incorporated by reference herein in their entirety.

TECHNICAL FIELD

The present disclosure relates to a wireless communication system, and more particularly, to a method of transmitting and receiving data for reliability enhancement based on multiple transmission reception points (TRPs) and an apparatus supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure proposes a method for transmitting and receiving, by a UE supported by multiple transmission reception points (TRPs), data in a wireless communication system.

Specifically, the present disclosure proposes a codeword to layer mapping method by considering a single codeword transmission in 5 or more layers.

Furthermore, the present disclosure proposes a codeword to layer mapping method by considering the transmission of a plurality of codewords in 4 or less layers.

Furthermore, the present disclosure proposes a method of configuring/indicating so that a UE identifies that a plurality of codewords is included in the same transport block.

Furthermore, the present disclosure proposes a method of defining a new DMRS table for a codeword to layer mapping method proposed in the present disclosure and a method using and the existing DMRS table.

Furthermore, the present disclosure proposes a method of encoding HARQ-ACK information for a plurality of codewords.

Technical objects to be achieved in the disclosure are not limited to the aforementioned technical objects, and other technical objects not described above may be evidently understood by a person having ordinary skill in the art to which the disclosure pertains from the following description.

Technical Solution

A method of receiving data by a user equipment (UE) in a wireless communication system according to an embodiment of the present disclosure includes receiving control information related to a first codeword and a second codeword, and receiving the first codeword and the second codeword through a physical layer, based on the control information. Based on a pre-defined rule, it may be identified that the first codeword and the second codeword correspond to the same transport block in a higher layer of the physical layer.

Furthermore, in the method according to an embodiment of the present disclosure, the pre-defined rule may be related to a specific Radio Network Temporary Identifier (RNTI). When the control information includes a cyclic redundancy check (CRC) scrambled by the specific RNTI, the correspondence to the same transport block may be identified.

Furthermore, in the method according to an embodiment of the present disclosure, the specific RNTI may be a modulation coding scheme cell RNTI (MCS-C-RNTI).

Furthermore, in the method according to an embodiment of the present disclosure, the control information may include fields of a modulation coding scheme (MCS), a New Data Indicator (NDI) and a Redundancy Version (RV), and the pre-defined rule may be determined based on a combination of at least two of the MCS, NDI or RV.

Furthermore, in the method according to an embodiment of the present disclosure, when a value of the MCS is a value related to the retransmission of the data and the NDI corresponds to a value related to initial transmission of the data, the correspondence to the same transport block may be identified.

Furthermore, in the method according to an embodiment of the present disclosure, at least one of an modulation order or the RV of the first codeword and the second codeword may be applied differently.

Furthermore, in the method according to an embodiment of the present disclosure, when the control information includes a plurality of Transmission Configuration Indicator (TCI) states, the correspondence to the same transport block may be identified.

Furthermore, in the method according to an embodiment of the present disclosure, each of the first codeword and the second codeword corresponds to a different TCI state among the plurality of TCI states.

Furthermore, the method according to an embodiment of the present disclosure further includes transmitting feedback information for the first codeword and the second codeword. The feedback information may include 1 bit.

Furthermore, in the method according to an embodiment of the present disclosure, the control information may include resource information of the first codeword and resource information of the second codeword. The resource information of the second codeword may be configured based on the resource information of the first codeword.

Furthermore, in the method according to an embodiment of the present disclosure, based on identification that the first codeword and the second codeword correspond to the same transport block, specific DMRS related information may be used for data reception.

Furthermore, in the method according to an embodiment of the present disclosure, the specific DMRS related information may include an association relationship between 4 or less layers and the first codeword and the second codeword.

Furthermore, in the method according to an embodiment of the present disclosure, the control information may further include a field for indicating a value included in the specific DMRS related information.

Furthermore, in the method according to an embodiment of the present disclosure, information related to the size of the transport block may be indicated using a part of the number of bits allocated to the field for indicating the value included in the specific DMRS related information.

A user equipment (UE) transmitting and receiving data in a wireless communication system according to an embodiment of the present disclosure includes one or more transceivers, one or more processors, and one or more memories storing instructions for operations executed by the one or more processors and connected to the one or more processors. The operations include receiving control information related to a first codeword and a second codeword and receiving the first codeword and the second codeword through a physical layer, based on the control information. Based on a pre-defined rule, the UE may identify that the first codeword and the second codeword correspond to the same transport block in a higher layer of the physical layer.

A method of transmitting data by a base station (BS) in a wireless communication system according to an embodiment of the present disclosure includes transmitting, to a user equipment (UE), control information related to a first codeword and a second codeword and transmitting, to the UE, the first codeword and the second codeword through a physical layer, based on the control information. The control information may be configured that the UE identifies that the first codeword and the second codeword correspond to the same transport block transmitted from a higher layer of the physical layer.

Furthermore, in the method according to an embodiment of the present disclosure, the control information may include fields of a modulation coding scheme (MCS), a New Data Indicator (NDI) or a Redundancy Version (RV). At least two of the MCS, NDI or RV are configured to be a specific combination.

A base station (BS) transmitting and receiving data in a wireless communication system according to an embodiment of the present disclosure includes one or more transceivers, one or more processors, and one or more memories storing instructions for operations executed by the one or more processors and connected to the one or more processors. The operations include transmitting, to a user equipment (UE), control information related to a first codeword and a second codeword and transmitting, to the UE, the first codeword and the second codeword through a physical layer, based on the control information. The control information may be configured that the UE identifies that the first codeword and the second codeword correspond to the same transport block transmitted from a higher layer of the physical layer.

In an apparatus including one or more memories and one or more processors functionally connected to the one or more memories according to an embodiment of the present disclosure, the one or more processors control the apparatus to receive control information related to a first codeword and a second codeword and to receive the first codeword and the second codeword through a physical layer, based on the control information. Based on a pre-defined rule, it may be identified that the first codeword and the second codeword correspond to the same transport block in a higher layer of the physical layer.

In one or more non-transitory computer-readable media storing one or more instructions according to an embodiment of the present disclosure, the one or more instructions executable by one or more processors includes instructions for instructing a user equipment (UE) to receive control information related to a first codeword and a second codeword and to receive the first codeword and the second codeword through a physical layer, based on the control information. Based on a pre-defined rule, it may be identified that the first codeword and the second codeword correspond to the same transport block in a higher layer of the physical layer.

Advantageous Effects

According to an embodiment of the present disclosure, a single codeword may be mapped to a layer and transmitted/received even in 5 or more layers.

Furthermore, according to an embodiment of the present disclosure, a plurality of codewords may be mapped to a layer and transmitted/received even in 4 or less layers.

Furthermore, according to an embodiment of the present disclosure, when a plurality of codewords is transmitted/received for reliability enhancement, it may be identified that a transport block corresponding to a corresponding codeword is the same.

Furthermore, according to an embodiment of the present disclosure, a new DMRS table for a newly proposed codeword to layer mapping method may be defined.

Furthermore, the present disclosure can reduce the number of bits necessary to feed back HARQ-ACK information by also encoding HARQ-ACK information for a plurality of codewords.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompany drawings, which are included to provide a further understanding of the disclosure and are incorporated on and constitute apart of this disclosure illustrate embodiments of the disclosure and together with the description serve to explain the principles of the disclosure.

FIG. 1 is a diagram illustrating an example of an overall system structure of NR to which a method proposed in the disclosure may be applied.

FIG. 2 illustrates a relationship between an uplink frame and a downlink frame in a wireless communication system to which a method proposed in the disclosure may be applied.

FIG. 3 illustrates an example of a frame structure in an NR system.

FIG. 4 illustrates an example of a resource grid supported by a wireless communication system to which a method proposed in the disclosure may be applied.

FIG. 5 illustrates examples of a resource grid for each antenna port and numerology to which a method proposed in the disclosure may be applied.

FIG. 6 illustrates physical channels and general signal transmission used in a 3GPP system.

FIG. 7 illustrates an example of a downlink transmission/reception operation.

FIG. 8 illustrates an example of an uplink transmission/reception operation.

FIG. 9 illustrates an example of a transmission/reception method for reliability enhancement using transmission in multiple TRPs.

FIG. 10 illustrates an example in which a transmission resource region of a codeword is configured to which a method and/or an embodiment proposed in the present disclosure may be applied.

FIG. 11 is an example of signaling of a HARQ-ACK feedback and DCI retransmission process according to a DCI reception failure.

FIG. 12 illustrates an example of a signaling procedure of performing data transmission and reception between a network side and a UE in a situation of multiple TRPs to which a method and/or an embodiment proposed in the present disclosure may be applied.

FIG. 13 illustrates an example of an operating flowchart of a UE that performs data transmission and reception to which a method and/or an embodiment proposed in the present disclosure may be applied.

FIG. 14 illustrates an example of an operating flowchart of a base station that performs data transmission and reception to which a method and/or an embodiment proposed in the present disclosure may be applied.

FIG. 15 illustrates a communication system 1 applied to the disclosure.

FIG. 16 illustrates a wireless device which may be applied to the disclosure.

FIG. 17 illustrates a signal processing circuit for a transmit signal.

FIG. 18 illustrates another example of a wireless device applied to the disclosure.

FIG. 19 illustrates a portable device applied to the disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the disclosure may be referred to for a background art, terms, omissions, etc., used for describing the disclosure. For example, the following documents may be referred to.

3GPP LTE
    36.211: Physical channels and modulation
    36.212: Multiplexing and channel coding
    36.213: Physical layer procedures
    36.300: Overall description
    36.331: Radio Resource Control (RRC)

3GPP NR
    38.211: Physical channels and modulation
    38.212: Multiplexing and channel coding
    38.213: Physical layer procedures for control
    38.214: Physical layer procedures for data
    38.300: NR and NG-RAN Overall Description
    36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms
- eLTE eNB: The eLTE eNB is the evolution of eNB that supports connectivity to EPC and NGC.
- gNB: A node which supports the NR as well as connectivity to NGC.
- New RAN: A radio access network which supports either NR or E-UTRA or interfaces with the NGC.
- Network slice: A network slice is a network created by the operator customized to provide an optimized solution for a specific market scenario which demands specific requirements with end-to-end scope.
- Network function: A network function is a logical node within a network infrastructure that has well-defined external interfaces and well-defined functional behavior.
- NG-C: A control plane interface used on NG2 reference points between new RAN and NGC.
- NG-U: A user plane interface used on NG3 references points between new RAN and NGC.
- Non-standalone NR: A deployment configuration where the gNB requires an LTE eNB as an anchor for control plane connectivity to EPC, or requires an eLTE eNB as an anchor for control plane connectivity to NGC.
- Non-standalone E-UTRA: A deployment configuration where the eLTE eNB requires a gNB as an anchor for control plane connectivity to NGC.
- User plane gateway: A termination point of NG-U interface.

Overview of System

FIG. 1 illustrates an example of an overall structure of a NR system to which a method proposed in the disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and $N_{slot}^{subframe,\mu}$ the number slot of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
| --- | --- | --- | --- |
| 2 | 12 | 40 | 4 |

FIG. 3 illustrates an example of a frame structure in a NR system. FIG. 3 is merely for convenience of explanation and does not limit the scope of the disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the disclosure is applicable.

Referring to FIG. 4, a resource grid consists of $N_{RB}^\mu N_{sc}^{RB}$ subcarriers on a frequency domain, each subframe consisting of $14 \cdot 2^\mu$ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \le N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the disclosure is applicable.

Each element of the resource grid for the numerology μ and the antenna port p is called a resource element and is uniquely identified by an index pair (k,l̄), where k=0, . . . , $N_{RB}^\mu N_{sc}^{RB}-1$ is an index on a frequency domain, and l̄=0, . . . , $2^\mu N_{symb}^{(\mu)}-1$ refers to a location of a symbol in a subframe. The index pair (k,l) is used to refer to a resource element in a slot, where l=0, . . . , $N_{symb}^\mu-1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indices p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

For example, in the NR system, the DCI format 0_0, the DCI format 0_1 is used for the scheduling of a PUSCH in one cell, and the DCI format 1_0, the DCI format 1_1 is used for the scheduling of a PDSCH in one cell. Information included in the DCI format 0_0 is CRC scrambled by a C-RNTI or a CS-RNTI or an MCS-C-RNTI and is transmitted. Furthermore, the DCI format 0_1 is used to schedule a PUSCH in one cell. Information included in the DCI format 0_1 is CRC scrambled by a C-RNTI or a CS-RNTI or an SP-CSI-RNTI or an MCS-C-RNTI and is transmitted. The DCI format 1_0 is used for the scheduling of a PDSCH in one DL cell. Information included in the DCI format 1_0 is CRC scrambled by a C-RNTI or a CS-RNTI or an MCS-C-RNTI and is transmitted. The DCI format 1_1 is used for the scheduling of a PDSCH in one cell. Information included in the DCI format 1_1 is CRC scrambled by a C-RNTI or a CS-RNTI or an MCS-C-RNTI and is transmitted. The DCI format 2_1 is used to notify a PRB(s) and an OFDM symbol(s) which may be assumed that a UE has not intended transmission. Information, such as preemption indication 1, preemption indication 2, . . . , preemption indication N included in the DCI format 2_1 is CRC scrambled by an INT-RNTI and is transmitted.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Downlink and Uplink Transmission/Reception Operation
Downlink (DL) Transmission and Reception Operation FIG. 7 illustrates an example of a downlink transmission and reception operation.

Referring to the FIG. 7, The eNB may schedule downlink transmission such as the frequency/time resource, the transport layer, an downlink precoder, the MCS, etc., (S701). Specifically, the eNB may determine a beam for PDSCH transmission to the UE. In addition, the UE may receive Downlink Control Information (DCI) for downlink scheduling (i.e., including scheduling information of the PDSCH) on the PDCCH (S702). DCI format 1_0 or DCI format 1_1 may be used for the downlink scheduling and specifically, DCI format 1_1 may include information such as the following examples: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization In particular, according to each state indicated in an antenna port(s) field, the number of DMRS ports may be scheduled, and single-user (SU)/Multi-user (MU) transmission scheduling is also available. Further, a TCI field is configured with 3 bits, and the QCL for the DMRS may be dynamically indicated by indicating a maximum of 8 TCI states according to a TCI field value. And, the UE may receive downlink data from the eNB on the PDSCH (S703). When the UE detects a PDCCH including the DCI format 1_0 or 1_1, the UE may decode the PDSCH according to the indication by the corresponding DCI.

Here, when the UE receives a PDSCH scheduled by DCI format 1, a DMRS configuration type may be configured by higher layer parameter "dmrs-Type" in the UE and the DMRS type is used for receiving the PDSCH. Further, in the UE, the maximum number of front-loaded DMRS symbols for the PDSCH may be configured by higher layer parameter "maxLength."

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not related to PDSCH transmission to another UE.

When the UE receives the PDSCH, a precoding granularity P' may be assumed as a consecutive resource block in the frequency domain. Here, P' may correspond to one value of {2, 4, and wideband}. When P' is determined as wideband, the UE does not predict that the PDSCH is scheduled to non-contiguous PRBs and the UE may assume that the same precoding is applied to the allocated resource. On the contrary, when P' is determined as any one of {2 and 4}, a Precoding Resource Block (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target coding rate, and a transport block size, the UE may first read a 5-bit MCS field in the DCI and determine the modulation order and the target coding rate. In addition, the UE may read a redundancy version field in the DCI and determine a redundancy version. In addition, the UE may determine the transport block size by using the number of layers before rate matching and the total number of allocated PRBs.

The transport block may be constituted by one or more code block groups (CBGs) and one CBG may be constituted by one or more code blocks (CBs). Further, in the NR system, in addition transport block-unit data transmission/reception, CB/CBG-unit data transmission/reception may be possible. Accordingly, CB/CBG-unit ACK/NACK transmission and retransmission may also be possible. The UE may receive, from the BS, information on the CB/CBG through DCI (e.g., DCI format 0_1, DCI format 1_1, etc.). Further, the UE may receive, from the BS, information on a data transmission unit (e.g., TB/CB/CBG).

Uplink Transmission and Reception Operation

FIG. 8 illustrates an example of an uplink transmission and reception operation.

Referring to the FIG. 8, the eNB may schedule uplink transmission such as the frequency/time resource, the transport layer, an uplink precoder, the MCS, etc., (S801). In particular, the eNB may determine a beam for PUSCH transmission of the UE through the beam management operations described above. And, the UE may receive, from the eNB, DCI for downlink scheduling (i.e., including scheduling information of the PUSCH) on the PDCCH (S802). DCI format 0_0 or 0_1 may be used for the uplink scheduling and in particular, DCI format 0_1 may include information such as the following examples: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter "usage" may be indicated by an SRS resource indicator field. Further, "spatialRelationInfo" may be configured for each SRS resource and a value of "spatialRelationInfo" may be one of {CRI, SSB, and SRI}.

In addition, the UE may transmit the uplink data to the eNB on the PUSCH (S803). When the UE detects a PDCCH including DCI format 0_0 or 0_1, the UE may transmit the corresponding PUSCH according to the indication by the corresponding DCI. Codebook based transmission scheme and non-codebook based transmission scheme are supported for PUSCH transmission.

In the case of the codebook based transmission, when higher layer parameter txConfig" is set to "codebook", the UE is configured to the codebook based transmission. On the contrary, when higher layer parameter txConfig" is set to "nonCodebook", the UE is configured to the non-codebook based transmission. When higher layer parameter "txConfig" is not configured, the UE does not predict that the PUSCH is scheduled by DCI format 0_1. When the PUSCH is scheduled by DCI format 0_0, the PUSCH transmission is based on a single antenna port. In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter "nrofSRS-Ports". When the UE is set to higher layer parameter "txConfig" set to "codebook", at least one SRS resource is configured in the UE. An SRI indicated in slot n is associated with most recent transmission of the SRS resource identified by the SRI and here, the SRS resource precedes PDCCH (i.e., slot n) carrying the SRI.

In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter "srs-ResourceIndicator". The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter "usage" set to "non-Codebook". The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

QCL (Quasi-Co Location)

An antenna port is defined so that a channel in which symbols on an antenna port are carried is inferred from a channel in which other symbols on the same antenna port are carried. If the property of a channel in which symbols on one antenna port are carried may be inferred from a channel in which symbols on another antenna port are carried, the two antenna ports may be said to have a quasi co-located or quasi co-location (QC/QCL) relation.

In this case, the channel property includes one or more of delay spread, Doppler spread, a frequency/Doppler shift, average received power, received timing/average delay, and a spatial RX parameter. In this case, the spatial Rx parameter means a spatial (reception) channel property parameter, such as an angle of arrival.

A UE may be configured with a list of up to M TCI-State configurations within a higher layer parameter PDSCH-Config in order to decode a PDSCH based on a detected PDCCH having DCI intended for the corresponding UE and a given serving cell. The M depends on the UE capability.

Each of the TCI-States includes a parameter for setting a quasi co-location relation between one or two DL reference signals and the DM-RS port of a PDSCH.

The quasi co-location relation is configured with a higher layer parameter qcl-Type1 for the first DL RS and qcl-Type2 (if configured) for the second DL RS. In the case of the two DL RSs, QCL types are the same regardless of whether a reference is the same DL RS or different DL RS or not.

A quasi co-location type corresponding to each DL RS is given by the higher layer parameter qcl-Type of QCL-Info, and may adopt one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, it may be indicated/configured that corresponding NZP CSI-RS antenna ports have been QCLed with a specific TRS from a QCL-Type A viewpoint and OCLed with a specific SSB from a QCL-Type D viewpoint. A UE that has received such an indication/configuration may receive a corresponding NZP CSI-RS using a Doppler, delay value measured in a QCL-Type A TRS, and may apply, to corresponding NZP CSI-RS reception, an Rx beam used for QCL-Type D SSB reception.

A UE may receive an activation command based on MAC CE signaling used to map up to 8 TCI states to the code point of a DCI field "Transmission Configuration Indication."

Codeword (CW) to Layer Mapping

A codeword (CW) refers to separate data stream including information to be transmitted through a physical channel. In the current LTE, NR system, 2 CWs (e.g., CW0, CW1) are defined. All channels use CW0, and CW1 may be used in some cases. For example, when spatial multiplexing is used, CW1 may be available.

Table 5 shows an example of CW to layer mapping relationship for spatial multiplexing of the NR standard. UE assumes that complex-valued modulation symbols for each of the codewords to be transmitted are mapped onto one or several layers according to table 5. complex-valued modulation symbols $d^{(q)}(0), \ldots, d^{(q)}(M_{symb}^{(q)}-1)$ for codeword q may be mapped onto the layers $x(i)=[x^{(0)}(i) \ldots x^{(\upsilon-1)}(i)]^T$, $i=0, 1, \ldots M_{symb}^{layer}-1$. Here, $\upsilon$ is the number of layers, $M_{symb}^{layer}$ is the number of modulation symbols per layer).

TABLE 5

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 3 | 1 | $x^{(0)}(i) = d^{(0)}(3i)$<br>$x^{(1)}(i) = d^{(0)}(3i + 1)$<br>$x^{(2)}(i) = d^{(0)}(3i + 2)$ | $M_{symb}^{layer} = M_{symb}^{(0)}/3$ |
| 4 | 1 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$ | $M_{symb}^{layer} = M_{symb}^{(0)}/4$ |
| 5 | 2 | $x^{(0)}(i) = d^{(0)}(2i)$<br>$x^{(1)}(i) = d^{(0)}(2i + 1)$<br>$x^{(2)}(i) = d^{(1)}(3i)$<br>$x^{(3)}(i) = d^{(1)}(3i + 1)$<br>$x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(3i)$<br>$x^{(4)}(i) = d^{(1)}(3i + 1)$<br>$x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(4i)$<br>$x^{(4)}(i) = d^{(1)}(4i + 1)$<br>$x^{(5)}(i) = d^{(1)}(4i + 2)$<br>$x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(4i)$<br>$x^{(5)}(i) = d^{(1)}(4i + 1)$<br>$x^{(6)}(i) = d^{(1)}(4i + 2)$<br>$x^{(7)}(i) = d^{(1)}(4i + 3)$ | $M_{symb}^{layer} = M_{symb}^{(0)}/4 = M_{symb}^{(1)}/4$ |

The block of vectors $[x^{(0)}(i) \ldots x^{(\upsilon-1)}(i)]^T$, $i=0, 1, \ldots, M_{symb}^{layer}-1$ may be mapped to antenna ports according to equation 3.

$$\begin{bmatrix} y^{(p_0)}(i) \\ \vdots \\ y^{(p_{\upsilon-1})}(i) \end{bmatrix} = \begin{bmatrix} x^{(0)}(i) \\ \vdots \\ x^{(\upsilon-1)}(i) \end{bmatrix} \text{ where}$$

$$i = 0, \ldots, M_{symb}^{ap} - 1, M_{symb}^{ap} = M_{symb}^{layer}$$

[Equation 3]

The set of antenna ports $\{p_0, \ldots, p_{\upsilon-1}\}$ may be determined according to the procedure in [4, TS 38.212].

The aforementioned descriptions (e.g., the 3GPP system, the frame structure, the CW to layer mapping) may be applied/used by being combined with a method and/or an embodiment proposed in the present disclosure or may be supplemented to clarify a technical characteristic of a method proposed in the present disclosure. In the present disclosure, '/' may mean that contents divided by/are fully included (and) or only some of the contents are included (or).

Multi-Transmission/Reception Point (TRP) Related Operation

A technique of Coordinated Multi Point (CoMP) refers to a scheme in which a plurality of base stations exchange (e.g., use the X2 interface) or utilize channel information (e.g., RI/CQI/PMI/LI, etc.) fed back from the UE, coordinated transmission to the UE, to effectively control interference.

According to a scheme using the channel information fed back from the UE, types of CoMP may be classified into Joint transmission (JT), Coordinated scheduling (CS), Coordinated beamforming (CB), dynamic point selection (DPS), dynamic point blanking (DPB), etc.

NCJT (Non-coherent joint transmission) may mean cooperative transmission that does not consider interference (i.e., no coherence). As an example, the NCJT may be a method in which base station(s) transmit data to one UE using same time resource and frequency resource through multiple TRPs. In this case, multiple TRPs of base station(s) may be configured to transmit data to the UE through different layers using different demodulation reference signal (DMRS) ports. In other words, the NCJT may correspond to a transmission scheme in which transmission of the MIMO layers is performed from two or more TRPs without adaptive precoding between the TRPS.

The NCJT is divided into fully overlapped NCJT in which time frequency resources transmitted by respective TRPs are fully overlapped and partially overlapped NCJT in which only some time frequency resources are overlapped. That is, in the case of the partially overlapped NCJT, both transmission data of TRP1 and TRP2 are transmitted in some time frequency resources, and only one TRP of TRP1 or TRP2 transmits data in the remaining time frequency resources.

TRP transmits data scheduling information to a UE receiving the NCJT as Downlink Control Information (DCI). From the DCI transmission point of view, M-TRP (multiple TRP) transmission schemes are divided into i) multiple DCI (M-DCI) based M-TRP transmission scheme in which each TRP transmits a different DCI and ii) single DCI (S-DCI) based M-TRP transmission scheme in which one TRP transmits DCI.

First, a single DCI based MTRP scheme is described. In the single DCI based M-TRP scheme in which one representative TRP delivers scheduling information for data transmitted by itself and data transmitted by another TRP via single DCI, MTRP cooperatively transmit a common one PDSCH and each TRP participating in cooperative transmission transmits the corresponding PDSCH by spatially dividing into different layers (i.e., different DMRS ports). In other words, MTRP transmit one PDSCH, but each TRP transmits only some layers of multiple layers comprising the one PDSCH. For example, when 4 layer data is transmitted, TRP 1 transmits 2 layers and TRP 2 transmits remaining 2 layers to the UE.

In this case, scheduling information for the PDSCH is indicated to the UE through one DCI, and the corresponding DCI indicates which DMRS port uses which QCL RS and QCL type of information (this is different from indicating QCL and TYPE to be commonly applied to all DMRS ports indicated by the DCI in the related art). That is, M TCI states are indicated through a TCI field in the DCI (in the case of 2 TRP coordinated transmission, M=2), and the QCL RS and type are determined by using M different TCI states for each of M DMRS port groups. Further, DMRS port information may be indicated by using a new DMRS table.

As an example, in the case of the S-DCI, since all scheduling information for data transmitted by M TRPs should be delivered through one DCI, the S-DCI may be used in an ideal backhaul (BH) environment in which two TRPs may be dynamically coordinated with each other.

Second, a multiple DCI based MTRP scheme is described. MTRPs transmit different DCIs and PDSCHs (UE receives N DCIs and N PDSCHs from N TRPs), and (some or all of) the corresponding PDSCHs are overlapped and transmitted on different frequency time resources. The corresponding PDSCHs may be scrambled through different scrambling IDs and the corresponding DCIs may be transmitted through Coresets which belong to different Coreset groups (Coreset group may be determined as an index defined a Coreset configuration of each Coreset, and for example, if index=0 is configured in Coresets 1 and 2 and index=1 is configured in Coresets 3 and 4, Coresets 1 and 2 belongs to Coreset group 0 and Coresets 3 and 4 belong to Coreset group 1. Further, in a case where the index in the Coreset is not defined, the case may be construed as index=0. When a plurality of scrambling IDs is configured or two or more Coreset groups are configured in one serving cell, it can be seen that the UE receives data by a multiple DCI based MTRP operation.

As an example, whether the used scheme is the single DCI based MTRP scheme or the multiple DCI based MTRP scheme may be indicated to the UE through separate signaling. As an example, when multiple CRS patterns are indicated to the UE for the MTRP operation with respect to one serving cell, PDSCH rate matching for the CRS may vary depending on whether the used scheme is the single DCI based MTRP scheme or the multiple DCI based MTRP scheme.

A base station (BS) described in the present disclosure may be a generic term for an object that transmits/receives data to and from a terminal (or a user equipment (UE)). For example, the BS described herein may be a concept including one or more transmission points (TP), one or more transmission and reception points (TRP), and the like. For example, multiple TPs and/or multiple TRPs described herein may be included in one BS or included in multiple BSs. In addition, the TP and/or TRP may include a panel of a BS, a transmission and reception unit, and the like.

Furthermore, a TRP described in the present disclosure may mean an antenna array including one or more antenna elements available in a network at a specific geographical location of a specific area. In the present disclosure, a "TRP" is basically described for convenience of description, but the TRP may be substituted and understood/applied as a base station, a transmission point (TP), a cell (e.g., a macro cell/small cell/pico cell), an antenna array or a panel, etc.

Further, a CORESET group ID described in the present disclosure may mean index/identification information (e.g., ID)/indicator, etc. for identifying a CORESET configured for/associated with each TRP/panel (or, for each TRP/panel). In addition, a CORESET group may be a group/union of CORESETs which are distinguished by the index/identification information (e.g., ID)/CORESET group ID, etc., for distinguishing the CORESET. As an example, the CORESET group ID may specific index information defined within a CORESET configuration. As an example, the CORESET group may be configured/indicated/defined by an index defined in the CORESET configuration for each CORESET. The CORESET group ID may be configured/indicated via higher layer signaling (e.g., RRC signaling)/L2 signaling (e.g., MAC-CE)/L1 signaling (e.g., DCI), etc.

M-TRP (Multiple-TRP) Transmission Schemes

An M-TRP transmission scheme in which multiple (e.g., M) TRPs transmit data to one user equipment (UE) may be divided into two main types, eMBB M-TRP transmission which is a scheme for increasing a transmission rate and URLLC M-TRP transmission which is a scheme for increasing a reception success rate and reducing latency.

URLLC M-TRP may mean that M TRPs transmit the same transport block (TB) by using different layers/times/frequencies. It may be assumed that a UE which is configured with an URLLC M-TRP transmission scheme is indicated with multiple TCI state(s) through the DCI and data received by using a QCL RS of each TCI state are the same TB. On the contrary, eMBB M-TRP may mean that M TRPs transmit different TBs by using different layers/times/frequencies. It may be assumed that a UE which is configured with an eMBB M-TRP transmission scheme is indicated with multiple TCI state(s) through the DCI and the data received by using the QCL RS of each TCI state are different TBs.

For example, as the UE separately uses an RNTI configured for a purpose of MTRP-URLLC and an RNTI configured for a purpose of MTRP-eMBB, the UE may determine/decide whether the corresponding M-TRP transmission, URLLC transmission or eMBB transmission. That is, when CRC masking of the DCI received by the UE is performed by using the RNTI configured for the purpose of the MTRP-URLLC, this may correspond to the URLLC transmission and when the CRC masking of the DCI is performed by using the RNTI configured for the purpose of the MTRP-URLLC, this may correspond to the eMBB transmission.

Reliability Enhancement Scheme in Multi-TRP

FIG. 9 is an example of a transmission and reception method for improving reliability supported by multiple TRPs, the following two methods may be considered.

The example of FIG. 9(a) illustrates a case where layer groups transmitting the same codeword (CW)/TB (transport block) correspond to different TRPs. That is, same CW may be transmitted through different layers/layer groups. In this case, the layer group may mean a kind of layer set comprising one layer or one or more layers. As described above, as the number of layers increases, the quantity of transmission resources increases, and thus, there is an advantage in that robust channel coding of a low coding rate may be used for the transport block (TB). Further, since channels from multiple TRPs are different, reliability enhancement of a received signal may be expected based on a diversity gain.

Meanwhile, the example of FIG. 9(b) illustrates an example of transmitting different CWs through layer groups corresponding to different TRPs. That is, different CWs are transmitted through different layers/layer groups. In this case, it may be assumed that TBs corresponding to a first CW (CW #1) and a second CW (CW #2) are the same as each other. Accordingly, the example may be regarded as an example of repeated transmission of the same TB. The case of FIG. 9(b) may have a disadvantage that the coding rate corresponding to the TB is high as compared with the case of FIG. 9(a). However, there is an advantage in that the coding rate may be adjusted by indicating different redundancy version (RV) values for encoding bits generated from the same TB according to a channel environment or a modulation order of each CW may be controlled.

In FIG. 9(a) or 9(b), as the same TB is repeatedly transmitted through different layer groups and different TRPs/panels transmit each layer group, a data reception probability may be increased and this is referred to as a spatial division multiplexing (SDM) based M-TRP URLLC transmission scheme. Layers which belong to different layer groups are transmitted through DMRS ports which belong to different DMRS CDM groups, respectively.

Further, the above-described contents related to multiple TRPs are described based on a spatial division multiplexing (SDM) scheme using different layers, but this may be, of course, extensively applied even to a frequency division multiplexing (FDM) scheme based on different frequency domain resources (e.g., RB/PRB (set) and/or a time division multiplexing (TDM) scheme based on different time domain resources (e.g., slot, symbol, sub-symbol).

When a base station transmits and receives data (e.g., a DL-SCH, a PDSCH) to and from a UE, a non-coherent joint transmission (NJCT method may be considered. In this case, the NCJT may mean a coordinated transmission in which interference is not considered (i.e., not having interference). For example, the NCJT may be a method of transmitting data from a base station(s) to one UE through multiple TRPs by using the same time resource and frequency resource. In the corresponding method, multiple TRPs of the base station(s) may be configured to transmit data to the UE through another layer by using different demodulation reference signal (DMRS) ports.

Hereinafter, in the present disclosure, a method which may be proposed when a coordinated transmission (e.g., NCJT) between multiple base stations (e.g., multiple TP/TRPs of one or more base stations) and a UE in a wireless communication system is considered is described. Hereinafter, methods described in the present disclosure are described on the basis of one or more TP/TRPs of a base station(s), but the corresponding methods may also be applied to a transmission based on one or more panels of a base station(s) in the same or similar way.

<Proposal 1>

Referring to Table 5, in a current standard, a CW to layer mapping relation branched from 2 codewords (CWs) is defined for only the number of layers of 5 or more layers. However, if a multiple-TRP transmission for reliability enhancement is considered as a method (i.e., a method of transmitting the same CW through different layer groups), such as the example of FIG. 9(a), a CW to layer mapping relation branched from a single CW needs to be defined for 5 or more layers. In Proposal 1 of the present disclosure, a CW to layer mapping relation branched from a single codeword may be defined for the number of layers of 5 or more layers. If such a mapping relation is applied, when compared to the existing 2-CW transmission (e.g., a transmission in which two CWs are the same transport block (TB)), there is an advantage in that a base station can transmit, to a UE, a CW to which robust channel coding has been applied because the base station can generate a signal having a lower coding rate.

A new CW to layer mapping relation proposed in the present disclosure may be implicitly or explicitly configured/indicated for a UE through higher layer signaling (e.g., RRC a signaling, a MAC-CE) and/or DCI signaling and/or an RNTI between a base station and the UE. In other words, if a new CW to layer mapping relation needs to be defined as in Proposal 1, a configuration/indication is necessary for a UE so that the UE can be aware that which mapping method has been applied because the mapping method may collide against a mapping method defined in a current standard. To this end, an implicit or explicit signaling method through higher layer signaling (e.g., RRC signaling, a MAC-CE) and/or DCI signaling and/or an RNTI may be considered. A UE that receives such a configuration/indication may identify that a specific DMRS table (e.g., Table 6) has been used.

In the present disclosure, a DMRS table may have been modified/changed from a table related to a DMRS CDM group and DMRS port defined for a MIMO operation in the existing NR standard. For example, a value in the DMRS table may be configured/indicated through an 'antenna port(s) and number of layers' field of DCI. In this case, the number of bits for indicating a value in the DMRS table can be reduced compared to a conventional method (in the conventional method, DMRS tables to be applied depending on dmrs-type, maxlength and a bit field length are divided).

For example, a CW to layer mapping method may be explicitly indicated/configured for a UE through a specific RRC parameter and/or DCI field. Alternatively, a CW to layer mapping method may be implicitly configured/indicated using an RRC parameter and/or a DCI field and/or an RNTI defined in a current standard. As a detailed example, in the case of DCI for which CRC check through a specific RNTI (e.g., a MCS-C-RNTI) is successful and/or if multiple TCI states are indicated for a UE through DCI, a UE may assume that a newly proposed CW to layer mapping method has been applied. In the present disclosure, an expression 'assume' may be understood as a meaning of 'identify/determine', and may also be interpreted as a multiple-TRP transmission for reliability enhancement. For example, a MCS-C-RNTI may be used to implicitly indicate a multiple-TRP transmission for reliability enhancement because it plays a role to indicate a MCS table in which relatively low spectral efficiency is considered.

Meanwhile, in a current standard, a DMRS port for the number of layers of 5 or more layers may be indicated for the case of only 2 CW. Accordingly, in order to apply a method proposed in the present disclosure, in the case of a single CW transmission, a DMRS table for indicating a DMRS port of a new combination for a UE needs to be defined. If a new CW to layer mapping method proposed in the present disclosure is indicated, a newly defined DMRS table (e.g., Table 6) may be applied.

Table 6 illustrates an example of a new DMRS table proposed in the present disclosure. Table 6 is an example in which a DMRS type 1 is assumed for convenience of description. It is evident that the aforementioned proposal may also be applied to a DMRS type 2.

TABLE 6

One Codeword:
Codeword 0 enabled,
Codeword 1 disabled

| value | Number of DMRS CDM group(s) without data | DMRS port(s) | Number of front-load symbols |
|---|---|---|---|
| 0 | 2 | 0, 2 | 1 |
| 1 | 2 | 1, 3 | 1 |
| 2 | 2 | 0, 1, 2 | 1 |
| 3 | 2 | 0, 1, 2, 3 | 1 |
| 4 | 2 | 0, 2 | 2 |
| 5 | 2 | 1, 3 | 2 |
| 6 | 2 | 4, 6 | 2 |
| 7 | 2 | 5, 7 | 2 |
| 8 | 2 | 0, 1, 2 | 2 |
| 9 | 2 | 4, 5, 6 | 2 |
| 10 | 2 | 0, 1, 2, 3 | 2 |
| 11 | 2 | 4, 5, 6, 7 | 2 |
| 12 | 2 | 0, 1, 2, 3, 4 | 2 |
| 13 | 2 | 0, 1, 2, 3, 4, 5 | 2 |
| 14 | 2 | 0, 1, 2, 3, 4, 5, 6 | 2 |
| 15 | 2 | 0, 1, 2, 3, 4, 5, 6, 7 | 2 |

Referring to Table 6, a DMRS port combination includes DMRS ports included in different CDM groups. If different two TCI states are indicated for a UE based on the DMRS port combination, it may be assumed that the different TCI states correspond to DMRS ports included in different CDM groups. For example, if a TCI state #1 and a TCI state #2 are indicated for a UE, when a DMRS port 0 and a DMRS port 2 are indicated, the UE may assume that the DMRS port 0 corresponding to a CDM group #0 corresponds to the TCI state #1 and the DMRS port 2 corresponding to a CDM group #1 corresponds to the TCI state #2.

Furthermore, in the example of Table 6, a method of reducing the number of bits necessary to define the DMRS table may also be considered by deleting some rows and reducing the amount of information by considering optimization. In the example of Table 6, if 4 bits are necessary to configure one of values of 0 to 15, but a DMRS table from which some rows have been deleted is defined, values in the DMRS table may be configured by using a smaller number of bits. For example, if MU-MIMO is not considered, a row corresponding to values 1, 5, 6, 7, 9, and 11 may not be defined. And/or if it is assumed that the number of layers transmitted in each TRP is the same, a row corresponding to values 2, 8, 9, 12, 14 corresponding to an odd number of layers may need not to be defined. And/or if a maximum number of layers is defined as a given x (x is a natural number), a row for the number of layers greater than x may need not be defined.

As described above, if the number of bits for a DMRS port indication/configuration is reduced through the optimization of a DMRS table, some (i.e., bits other than the number of bits for a reduced DMRS port configuration) of bits allocated for the existing DMRS port configuration may be used to indicate a modulation order of a modulation symbol corresponding to a layer transmitted from a specific TRP. By separately indicating a modulation order of a modulation symbol transmitted from a specific TRP, there is an effect in that a more suitable modulation order can be configured depending on a channel situation from the corresponding TRP. For example, in an environment in which a signal to interference plus noise ratio (SINR) is high, a high modulation order, such as 64/16 quadrature amplitude modulation (QAM), may be configured. In an environment in which the SINR is low, a low modulation order, such as quadrature phase shift keying (QPSK), may be may be configured.

Through the aforementioned proposal method, a UE can identify a multiple-TRP transmission for reliability enhancement, and thus can transmit and receive data based on the new CW to layer mapping method and DMRS table.

Meanwhile, proposals and examples of a signaling method of identifying an applied mapping method by a UE may be used to indicate a multi-TRP transmission for reliability enhancement. For example, among the proposal and one example, in the case of DCI for which CRC check is successful through an MCS-C-RNTI and/or if multiple TCI states are indicated for a UE through DCI, this may be interpreted as a multi-TRP transmission (i.e., URLLC M-TRP transmission) for reliability enhancement and may help a UE operation. Furthermore, such an indication method may be used as a method of configuring/indicating that TBs corresponding to two CWs are the same even in the following proposal.

<Proposal 2>

In an M-TRP transmission, 2-CW transmission for throughput improvement is a method of transmitting different CWs corresponding to different TBs. Even in the case of an M-TRP transmission for reliability enhancement, 2-CW transmission for CWs in different TRPs may be considered. In this case, a UE is configured/indicated with 2-CW transmission from a base station. However, when compared to the existing spatial multiplexing method having an object of enhancing a transmission, TBs corresponding to respective CWs may be the same in 2-CW transmission having an object of reliability enhancement. That is, it may be identified that TBs corresponding to respective CWs are the same based on a pre-defined rule and/or a configuration of a base station. In the following description, an expression 'assume' may be understood/interpreted as a meaning of 'identify/determine.'

Method 1)

A base station may configure/indicate that TBs corresponding to respective CWs are the same in 2-CW transmission. In order to configure/indicate that TBs corresponding to respective CWs are the same, the base station may implicitly or explicitly configure/indicate an operation for a UE by using higher layer signaling (e.g., RRC signaling, a MAC-CE) and/or DCI signaling and/or an RNTI. For example, a CW to layer mapping method may be explicitly indicated/configured for a UE through a specific RRC parameter and/or a DCI field. Alternatively, a CW to layer mapping method may be implicitly configured/indicated by using an RRC parameter and/or a DCI field and/or an RNTI defined in a current standard. For example, a base station may transmit, to a UE, DCI to which CRC scrambled using a specific RNTI (e.g., an MCS-C-RNTI) has been attached. When receiving DCI for which CRC check is successful through a specific RNTI (e.g., MCS-C-RNTI) and/or when multiple TCI states are indicated for a UE through DCI, the UE may assume that TBs corresponding to 2 CWs are the same. Furthermore, the UE has received the configuration/indication indicating that TBs corresponding to respective CWs are the same may assume that a specific DMRS table (e.g., Table 7) has been used.

In order to achieve the reliability enhancement object, a UE may also expect 2-CW transmission with respect to the number of layers of 4 or less layers. For example, in the case of 2-CW transmission using 2 layers, a first layer (layer #1) may correspond to a first CW (CW #1), and a second layer (layer #2) may correspond to a second CW (CW #2). Furthermore, in a current standard, in the case of 2-CW transmission, 2-CW transmission is possible for only 5 or more layers. Accordingly, a new DMRS table (e.g., Table 7) capable of indicating 2-CW transmission using 4 or less layers needs to be defined. Accordingly, for 2-CW transmission having the reliability enhancement object, a new CW to layer mapping and/or DMRS table may be considered.

Table 7 is an example of a DMRS table for indicating a DMRS port combination corresponding to the number of layers of 4 or less layers upon 2-CW transmission. Table 7 is merely an example for convenience of description, and does not limit a technical scope of the present disclosure. Table 7 is an example in which DMRS type 1 is assumed. It is evident that a similar method may be considered for DMRS type 2.

TABLE 7

| | One Codeword: Codeword 0 enabled, Codeword 1 disabled | | |
|---|---|---|---|
| value | Number of DMRS CDM group(s) without data | DMRS port(s) | Number of front-load symbols |
| 0 | 2 | 0, 2 | 1 |
| 1 | 2 | 1, 3 | 1 |
| 2 | 2 | 0, 1, 2 | 1 |
| 3 | 2 | 0, 1, 2, 3 | 1 |
| 4 | 2 | 0, 2 | 2 |
| 5 | 2 | 1, 3 | 2 |
| 6 | 2 | 4, 6 | 2 |
| 7 | 2 | 5, 7 | 2 |
| 8 | 2 | 0, 1, 2 | 2 |
| 9 | 2 | 4, 5, 6 | 2 |
| 10 | 2 | 0, 1, 2, 3 | 2 |

TABLE 7-continued

| | One Codeword: Codeword 0 enabled, Codeword 1 disabled | | |
|---|---|---|---|
| value | Number of DMRS CDM group(s) without data | DMRS port(s) | Number of front-load symbols |
| 11 | 2 | 4, 5, 6, 7 | 2 |
| 12 | 2 | 0, 1, 2, 3, 4 | 2 |
| 13 | 2 | 0, 1, 2, 3, 4, 5 | 2 |
| 14 | 2 | 0, 1, 2, 3, 4, 5, 6 | 2 |
| 15 | 2 | 0, 1, 2, 3, 4, 5, 6, 7 | 2 |

Referring to Table 7, a DMRS port combination includes DMRS ports included in different CDM groups. If different two TCI states are indicated for a UE based on the DMRS port combination, it may be assumed that the different TCI state correspond to the DMRS ports included in the different CDM groups. For example, if a TCI state #1 and a TCI state #2 are indicated for a UE, when a DMRS port 0 and a DMRS port 2 are indicated, the UE may assume that the DMRS port 0 corresponding to a CDM group #0 corresponds to the TCI state #1 and the DMRS port 2 corresponding to a CDM group #1 corresponds to the TCI state #2.

A new DMRS table may be defined by reducing the required number of bits compared to the existing DMRS table through optimization. For example, in the example of Table 7, the amount of information may be reduced by deleting some rows by considering optimization. In the example of Table 7, in order to configure one of values of 0 to 15, 4 bits are required. However, if a DMRS table from which some rows have been deleted is defined, values in the DMRS table may be configured by using a smaller number of bits. For example, if MU-MIMO is not considered, a row corresponding to values 1, 5, 6, 7, 9, and 11 may not be defined. And/or if it is assumed that the number of layers transmitted by a TRP is the same, a row corresponding to values 2, 8, 9, 12, and 14 corresponding to an odd-numbered number of layers may not be defined. And/or if a maximum number of layers are defined as given x (x is a natural number), a row for the number of layers greater than x may not be defined.

Meanwhile, as described above, DCI may include fields of a modulation and coding scheme (MCS), a new data indicator (NDI), a redundancy version (RV), etc. The MCS field may include an MCS index. A modulation order, a target coding rate and spectral efficiency may be determined based on an MCS index. In DCI, fields indicating an MCS/NDI/RV, etc. of respective TBs (e.g., TB 1, TB 2) are denoted as TB information fields. The TB information field may be a basis for calculating a TB size. For example, a TB information field for a TB 1 may be used to calculate the size of a TB corresponding to a first CW (CW #1). A TB information field for a TB 2 may be used to calculate the size of a TB corresponding to a second CW (CW #2).

According to the aforementioned proposal method, it may be assumed that TBs corresponding to two CWs are the same. If information included in a TB information field for a TB 1 and information included in a TB information field for a TB 2 are different, ambiguity may occur in calculating the size of a TB. Accordingly, it is necessary to configure/indicate, for a UE, a TB information field that is a basis for TB size calculation.

For example, if the number of bits for a DMRS port indication/configuration is reduced through the optimization of the aforementioned DMRS table, a corresponding configuration/indication may be performed using some of a DCI field for the existing DMRS port indication/configuration. That is, the remaining bits (e.g., MSB(s), LSB(s)) except the number of bits for a DMRS port in the existing DCI field may be used to indicate a TB information field that is a basis for TB size calculation. In such a case, although the number of layers corresponding to different CWs is not symmetrical, there is an advantage in that a base station can indicate, for a UE, the number of layers to be used for TB size calculation. For example, it may be assumed that in a 3-layer transmission, a layer 1 is mapped to a first CW (CW #1) and a layer 2 and a layer 3 are mapped to a second CW (CW #2) in CW to layer mapping. As in the proposal method, a base station may indicate, for a UE, a TB information field that is a basis for TB size calculation. The UE may select which one of a TB information field corresponding to the first CW and a TB information field corresponding to the second CW will be a basis based on such mapping, and may calculate a TB size by using the number of layers corresponding to the selected CW.

If a TB information field that is a basis for TB size calculation has been indicated according to the aforementioned proposal method, an MCS/NDI/RV value included in a not-indicated TB information field may be used for at least one of the followings. For example, in the case of an MCS value, a UE may be defined/configured to neglect a target coding rate/spectral efficiency value (with respect to a TB generated based on a TB information field that is a basis for TB size calculation) and to apply only a modulation order. As a detailed example, a UE may be defined/configured to apply only a modulation order of a not-indicated TB 2 with respect to a TB generated based on a TB information field of a TB 1. For another example, an RV value may be defined so that rate matching is performed based on an RV included in a not-indicated TB information field. As a detailed example, rate matching may be performed based on an RV of a not-indicated TB 2 with respect to a TB generated based on a TB information field of a TB 1.

The aforementioned method and embodiment using a not-indicated TB information field may be identically applied to a proposal method (e.g., method 2) to be described later.

Furthermore, as described above, if the number of bits for a DMRS port indication/configuration is reduced through the optimization of a specific DMRS table (e.g., Table 7), some of the existing bits and/or a specific TB information field (e.g., a TB information field not used for TB size calculation) of the two TB information fields may be used as a field for TCI state indication. In this case, this may be define independently of a field for TCI state indication defined in a current standard or may be defined as a single field along with a corresponding field.

For another example, as described above, the size of the specific DMRS table (e.g., Table 7) may be reduced compared to the existing defined DMRS table by reducing the number of bits for a DMRS port indication/configuration through optimization. In this case, some (e.g., an MSB(s), an LSB(s)) of the existing bits may be used to configure/indicate the transmission resource region of another CW based on the transmission resource (frequency/time) region of a specific CW in 2 CWs. Current single DCI may indicate one frequency domain/time domain for a UE. Accordingly, if different CWs are mapped to different resources, information on a resource region indicated through single DCI corresponds to a specific CW (e.g., CW #1). A resource region corresponding to another CW (e.g., CW #2) may be configured/indicated based on a resource region corresponding to the specific CW. In this case, the existing bits for the DMRS port indication/configuration reduced through DMRS table optimization may be used.

FIG. 10 illustrates an example in which the transmission resource region of another CW is configured based on the transmission resource region of a specific CW to which the aforementioned proposal method may be applied. FIG. 10(a) is an example in which a transmission resource region in a frequency resource is configured. FIG. 10(b) is an example in which a transmission resource region in a time resource is configured. FIG. 10 is merely an example for convenience of description, and does not limit a technical scope of the present disclosure. For example, resource region information for a first CW (CW #1) may be indicated through single DCI. Resource region information for a second CW (CW #2) may be configured/indicated as an offset value (e.g., a difference value between resource region indices), etc. based on the resource region of the first CW (CW #1). FIG. 10 illustrates an example of a configuration based on the start point of the resource region of the first CW (CW #1), but a configuration is possible based on the end point of the resource region of the first CW (CW #1).

Meanwhile, instead of defining a new DMRS table as in the proposal method, a DMRS table defined in a current standard may be used. In the case of a UE has received a configuration/indication indicating that TBs corresponding to two CWs are the same, a rule may be defined/configured so that the UE uses a DMRS port combination corresponding to 1 CW in a DMRS table defined in a current table although 2-CW transmission is indicated.

Table 8 illustrates an example of a DMRS table defined in the NR standard. For example, when 'dmrs-Type=1, maxLength=2' is configured, 2-CW transmission is indicated for a UE, and a value 11 is indicated, corresponding values are not defined as 'reserved' in corresponding parameters in Table 8. However, according to the proposal of the present disclosure, a UE that is configured/indicated as in the above example and has received a configuration/indication indicating that TBs corresponding to two CWs are the same may interpret a value corresponding to a 1 CW transmission. That is, the UE may assume that the DMRS port 0/2 has been indicated.

TABLE 8

Table 7.3.1.2.2-2: Antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |

TABLE 8-continued

Table 7.3.1.2.2-2: Antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

Method 2)

As a method of configuring/indicating that TBs corresponding to respective CWs are the same in 2-CW transmission, a method using a specific combination of parameters (e.g., an MCS, an NDI, an RV) of a TB information field within DCI may be considered. If a specific MCS and/or NDI and/or RV combination is indicated in a TB information field within DCI and/or multiple TCI states are indicated for a UE through DCI, the UE may assume that TBs corresponding to two CWs are the same. Furthermore, if the operation is indicated, the UE may assume that a specific DMRS table has been used. In the present disclosure, an expression 'assume' may be understood/interpreted as a meaning of 'identify/determine.' Furthermore, this may be interpreted as a multi-TRP transmission for reliability enhancement based on the configuration.

For example, if an MCS value corresponding to a 'reserved' MCS index and an NDI value corresponding to a value for indicating initial transmission, a UE may identify that TBs corresponding to respective CWs are the same. The 'reserved' MCS index is a value for indicating a modulation order in the case of retransmission. Such a combination may be interpreted as indicating an MCS for retransmission in initial transmission. In this case, a problem with a UE operation may occur because a UE cannot be aware of a coding rate for TB size calculation. Accordingly, the combination is a combination which cannot be expected in a normal environment, and may be used to indicate a special object, such as an assumption in the present proposal. In the case of the retransmission, as an example of the 'reserved' MCS index for indicating a modulation order, in Tables 5.1.3.1-1/2/3 defined in TS38.214 (v15.4.0), MCS indices may be 29, 30, 31/28, 29, 30, 31/29, 30, 31.

If what TBs corresponding to two CWs are the same is configured/indicated according to the proposal (e.g., method 2), the size of a TB may be calculated based on TB information indicated through an information field corresponding to a TB not corresponding to the specific combination among the information field of a TB 1 and the information field of a TB 2. Furthermore, MCS information to be applied to TB size calculation may be obtained through a TB information field other than a TB information field indicating the specific MCS/NDI/RV combination. Furthermore, upon TB size calculation, the number of layers may follow the number of layers of a CW corresponding to a TB information field not corresponding to the specific combination. For example, if the information field of the TB 1 includes MCS1/NDI1/RV1, the information field of the TB 2 includes MCS2/NDI2/RV2, and MCS2/NDI2/RV2 corresponding to the TB 2 is indicated for a UE as a specific combination defined in method 2, a TB size may be calculated based on MCS1 corresponding to the TB1. Furthermore, upon TB size calculation, the number of layers may follow the number of layers the first CW (CW #1) corresponding to the TB1.

Meanwhile, TBs may be identified as being the same, but different modulation orders may be applied to different CWs. Accordingly, there is an advantage in that a suitable modulation order can be applied to a different TRP depending on a channel situation. Specifically, a modulation order may be applied based on an MCS value indicted in a TB information field indicating the specific combination. For example, based on the aforementioned example, a TB size may be calculated using the information field of the TB 2. However, a modulation order may be applied based on an MCS value included in the information field of the TB 1 with respect to the TB 1. A modulation order may be applied based on an MCS value included in the information field of the TB 2 with respect to the TB 2.

Likewise, TBs may be identified to be the same, but different RV values may be applied to different CWs. coding rate has been indicated. And/or a modulation order indicated by the 'reserved' MCS may be applied to a CW corresponding to a TB for which a 'reserved' MCS has been indicated and/or an RV may follows a value indicated in the corresponding TB information field.

In a current standard, a toggle method is used when initial transmission and retransmission are indicated using an NDI value. Table 9 illustrates a description related to an NDI toggle operation of TS 38.321.

TABLE 9

5.3.2.2 HARQ process

When a transmission takes place for the HARQ process, one or two (in case of downlink spatial multiplexing) TBs and the associated HARQ information are received from the HARQ entity.
For each received TB and associated HARQ information, the HARQ process shall:
   1> if the NDI, when provided, has been toggled compared to the value of the previous received transmission
      corresponding to this TB; or
   1> if the HARQ process is equal to the broadcast process, and this is the first received transmission for the
      TB according to the system information schedule indicated by RRC; or
   1> if this is the very first received transmission for this TB (i.e. there is no previous NDI for this TB):
      2> consider this transmission to be a new transmission.

Accordingly, there is an advantage in that an effective coding rate can be adjusted from a viewpoint of a UE by indicating different RVs with respect to CWs transmitted at different TRPs. Specifically, an RV value of a corresponding TB may be indicated based on an RV value indicated in a TB information field indicated in the specific combination. For example, based on the aforementioned example, a TB size may be calculated using the information field of the TB 2, but an RV value included in the information field of the TB 1 may be applied to the TB 1 and an RV value included in the information field of the TB 2 may be applied to the TB 2.

Meanwhile, if what TBs corresponding to two CWs are the same is configured/indicated according to the proposal, a UE may assume that a specific DMRS table has been used. The specific DMRS table may be an example of a DMRS table (e.g., Table 7, Table 8) of Method 1). Furthermore, the contents in which the indication of a TCI state, a resource region configuration, etc. are performed using some of the number of bits for the aforementioned DMRS port indication/configuration may be identically applied to Method 2).

First Embodiment

For convenience of description, in an MTRP-based 2 CW (e.g., a first CW, a second CW) transmission, it is assumed that a first TB information field for a first TB corresponding to a first CW includes MCS1/RV1/NDI1 and a second TB information field for a second TB corresponding to a second CW includes MCS2/RV2/NDI2. When one of the two TB information fields (e.g., the first TB information field, the second TB information field) indicates an MCS including a target coding rate and the other thereof indicates a 'reserved' MCS not including a target coding rate, a UE may assume that TBs corresponding to the two CWs are the same. The UE may calculate a TB size based on the number of layers mapped to a CW corresponding to the TB information field corresponding to the MCS including the target coding rate.

Meanwhile, the CW corresponding to a TB for which a 'reserved' MCS has been indicated may be assumed to have the same TB size as a TB size calculated based on the TB information field in which the MCS including the target Meanwhile, when a UE feeds back HARQ-ACK information to a base station, although the UE fails in DCI reception, the NR standard has been defined so that NACK is fed back with respect to a PDSCH scheduled by the corresponding DCI. The base station that has received the feedback of NACK from the UE may be ambiguous about whether the UE has failed in DCI reception or PDSCH decoding. If the UE has failed in DCI reception, the base station cannot indicate a 'reserved' MCS for the UE because it has not obtained an MCS including a target coding rate information. As an example for supplementing such a disadvantage and using Method 2), the first embodiment may be considered.

FIG. 11 is an example of signaling of a HARQ-ACK transmission and DCI retransmission according to a DCI reception failure between a base station and a UE.

According to a current standard, any association relationship between an NDI 1 and an NDI 2, that is, between the first TB information field (e.g., TB 1) and the second TB information field (e.g., TB 2), is not assumed. Accordingly, referring to FIG. 11, a base station may transmit DCI to a UE (S1110). In this case, the DCI may include information indicating initial transmission through the NDI 1. The UE fails in DCI reception, and may feed NACK back to the base station (S1120). The base station may transmit DCI to the UE again (S1130). In this case, the base station cannot use 'reserved' MCS because it is unaware whether the UE has well received initial DCI indicative of initial transmission, and needs to use the MCS including the target coding rate, which is used in step S1110.

In contrast, if the aforementioned proposal method of the first embodiment is applied, the base station can indicate a 'reserved' MCS for the UE even in step S1130 of FIG. 11 because a correlation relation between two TBs can be used. Specifically, the base station may transmit, to the UE, initial DCI for indicating initial transmission (S1110). In this case, the base station may indicate initial transmission (i.e., indicate a value toggled from a previous value) for the UE through both the NDI 1 and the NDI 2, may indicate an MCS including a target coding rate in a specific MCS (e.g., MCS 1), and may indicate a 'reserved' MCS not including a target coding rate in another MCS (e.g., MCS 2). The UE may fail in DCI reception and feed NACK back to the base station (S1120). The base station may transmit DCI back to the UE (S1130). In this case, the base station may transmit, to the UE, DCI having the same value as the DCI transmitted in step S1110. When the UE receives the DCI transmitted in step S1130, the UE may receive indication for an MCS including a target coding rate through the MCS 1, and may calculate a TB size by using the corresponding value. Furthermore, although a 'reserved' MCS has been indicated through the MCS 2, but a TB size may be calculated through the MCS 1, the UE may not be influenced although it has not received previous DCI (i.e., DCI before step S1110).

Second Embodiment

As in the methods (e.g., method 1, method 2) of Proposal 2, it may be configured/indicated that TBs corresponding two CWs are the same through signaling (e.g., higher layer a signaling, DCI) from a base station and/or a specific rule and/or an RNTI. For example, when receiving DCI for which CRC check is successful through a specific RNTI (e.g., MCS-C-RNTI), a UE may assume that TBs corresponding to two CWs are the same when interpreting the corresponding DCI.

The UE that has received the configuration/indication indicating that TBs corresponding to respective CWs are the same may expect that an MCS including a target coding rate will be indicated in one of two TB information fields and a 'reserved' MCS will be indicated in the other field. Furthermore, the UE may calculate a TB size based on the number of layers mapped to a CW corresponding to the TB field corresponding to an MCS including a target coding rate. Meanwhile, it may be assumed that a CW corresponding to a TB for which a 'reserved' MCS has been indicated has the same TB size as a TB size calculated based on the TB field indicating the MCS including a target coding rate. And/or a modulation order indicated by a 'reserved' MCS may be applied to a CW corresponding to a TB for which a 'reserved' MCS has been indicated and/or an RV may also follow a value indicated in the corresponding TB information field.

<Proposal 3>

A UE that has received a configuration/indication indicating that TBs corresponding to two CWs are the same in a CW transmission may assume a 1 CW transmission in configuring a HARQ-ACK codebook.

According to the methods (e.g., method 1, method 2) of Proposal 2, in the case of a UE that has received a configuration/indication indicating that TBs corresponding to two CWs are the same in 2-CW transmission, 2-CW transmission has been indicated, but the number of actually received TB is one. Accordingly, whether a PDSCH has been received may be fed back to a base station through only a piece of HARQ-ACK information (e.g., ACK information, NACK information). That is, the UE may assume 1-CW transmission in configuring a HARQ-ACK codebook. According to the existing method, since 2-CW transmission is indicated, 2 bits are necessary for a HARQ-ACK codebook in order to feed back whether each CW has been received. However, if the proposal method is used, 1-CW transmission may be assumed, and a HARQ-ACK codebook can be configured using 1 bit. There is an effect in that PUSCH/PUCCH resources used for ARQ-ACK codebook transmission can be reduced.

FIG. 12 illustrating signaling when a UE receives single DCI (i.e. when one TRP transmits DCI to the UE) in an M-TRP (or M-cell, hereinafter, all TRPs may be replaced with cells or may be assumed as an M-TRP even though a plurality of CORESETs (/CORESET groups) has been configured by one TRP) situation. In FIG. 12, a representative case where a TRP 1 transmits DCI is assumed. However, such an assumption does not limit a technical scope of the present disclosure.

In the following description, a "TRP" is basically described, but as described above, a "TRP" may be applied by being replaced with an expression, such as a panel, an antenna array, a cell (e.g., a macro cell/small cell/pico cell), a transmission point (TP), a base station (gNB), etc. Furthermore, as described above, a TRP may be classified based on information (e.g., an index, an ID) on a CORESET group (or CORESET pool). For example, if one UE has been configured to perform transmission and reception with multiple TRPs (or cells), this may mean that multiple CORESET groups (or CORESET pools) have been configured for the one UE. Such a configuration for a CORESET group (or CORESET pool) may be performed through higher layer signaling (e.g., RRC signaling).

The UE may receive configuration information for multiple TRP based transmission and reception from the network side through/using TRP1 (and/or TRP2) (S1205). That is, the network side may transmit configuration information related to multiple TRP based transmission and reception to the UE through/using TRP1 (and/or TRP2) (S1205). The configuration information may include resource information related to a configuration (i.e., TRP configuration) of the network side, resource information (resource allocation) related to the multiple TRP based transmission and reception, etc. In this case, the configuration information may be transferred through higher layer signaling (e.g., RRC signaling, MAC-CE, etc.). Further, when the configuration information is pre-defined or configured, the corresponding step may also be skipped. For example, the configuration information may include configuration/indication information for the transport block (TB) described in the aforementioned proposal method (e.g., Proposal 1/2/3).

For example, the operation of the UE (100/200 in FIGS. 15 to 19) which receives the multiple TRP based transmission and reception related configuration information from the network side (100/200 in FIGS. 15 to 19) in step S1205 described above may be implemented by devices in FIGS. 15 to 19 to be described below. For example, referring to FIG. 16, one or more processors 102 may control one or more transceivers 106 and/or one or more memories 104 so as to receive the multiple TRP based transmission and reception related configuration information, and one or more transceivers 106 may receive configuration information and one or more transceivers 106 may receive the multiple TRP based transmission and reception related configuration information from the network side.

Likewise, the operation of the network side (100/200 in FIGS. 15 to 19) which transmits the multiple TRP based transmission and reception related configuration information to the UE (100/200 in FIGS. 15 to 19) in step S1205 described above may be implemented by the devices in FIGS. 15 to 19 to be described below. For example, referring to FIG. 16, one or more processors 102 may control one or more transceivers 106 and/or one or more memories 104 so as to transmit the multiple TRP based transmission and reception related configuration information, and one or more transceivers 106 may receive configuration information and one or more transceivers 106 may transmit the multiple TRP based transmission and reception related configuration information from the network side.

The UE may receive, from a network side, DCI and Data 1 scheduled by the corresponding DCI through/using a TRP 1 (S1210-1). Furthermore, the UE may receive Data 2 from the network side by using a TRP 2 (S1210-2). That is, the network side may transmit, to the UE, the DCI and Data 1 scheduled by the corresponding DCI through the TRP 1 (S1210-1). Furthermore, the network side may transmit Data 2 to the UE through/using the TRP 2 (S1210-2). In this case, the DCI may be configured to be used for the scheduling of both Data 1 and Data 2. Furthermore, for example, DCI and Data (e.g., Data 1, Data 2) may be transmitted through a control channel (e.g., a PDCCH) and a data channel (e.g., a PDSCH), respectively. Furthermore, steps S1210-1 and S1210-2 may be simultaneously performed or any one step may be performed prior to the other step.

For example, the Data 1 and the Data 2 may correspond to codewords (CWs), respectively. For example, a CW (e.g., a first codeword) corresponding to the Data 1 and a CW (e.g., a second codeword) corresponding to the Data 2 may be identified to correspond to the same transmission block (TB) based on the DCI. That is, the CWs may be identified to be encoded from the same transport block. Alternatively, the Data 1 and the Data 2 may be identified to be branched from the same CW based on the DCI.

For example, the DCI may include DMRS port information, TB-related information, indication for a codeword (CW) to layer mapping method, information for a relation between a CW and a transport block (TB), resource information related to a CW, TCI state-related indication, etc. described in the aforementioned method (e.g., Proposal 1/2/3). Furthermore, CRC scrambled using a specific RNTI (e.g., MCS-C-RNTI) based on the aforementioned method (e.g., Proposal 1/2/3) may be attached to the DCI.

Specifically, the DMRS port information may include information, a value (e.g., a field for indicating a DMRS port group), etc. related to a table (e.g., Table 6, Table 7, Table 8) for a DMRS port configuration/indication of the aforementioned method (e.g., Proposal 1/2/3). The size of bits of the table for the DMRS port configuration/indication may be reduced compared to the existing defined DMRS table.

The TB-related information may include parameters, such as an MCS, an NDI, or an RV. In order to configure/indicate what TBs corresponding to two CWs are the same, a combination of at least two parameters of the MCS, NDI or RV may be used. For example, an MCS may correspond to a 'reserved' MCS index. An NDI value may be configured as a value for indicating initial transmission.

Furthermore, the TB-related information may include information indicating a basis for calculating the size of a TB. For example, the information indicating a basis for calculating the size of a TB may be configured/indicated using some bits of a conventional field for indicating a DMRS port group.

Resource information related to a CW may include resource region information of first data (e.g., a first codeword) and resource region information of second data (e.g., a second codeword). For example, resource region information of first data (e.g., a first codeword) may be indicated through DCI. Resource region information of second data (e.g., a second codeword) may be configured based on the resource region information of the first data (e.g., the first codeword). For example, resource region information of second data (e.g., a second codeword) may be represented as an offset value of a resource region index of first data (e.g., a first codeword). For example, resource information related to a CW may be configured/indicated using some bits of a conventional field for indicating a DMRS port group.

Multiple TCI states may be configured/indicated through the DCI. For example, the TCI state-related indication may be configured/indicated using some of a conventional field for indicating a DMRS port group.

For example, in a process of encoding DCI/Data on the network side, a codeword may be mapped to a layer based on the aforementioned method (e.g., Proposal 1/2/3).

For example, the operation of the UE (100/200 in FIGS. 15 to 19) which receives DCI and/or Data 1 and/or Data 2 from the network side (100/200 in FIGS. 15 to 19) in step S1210-1/S1210-2 described above may be implemented by the devices in FIGS. 15 to 19 to be described below. For example, referring to FIG. 16, one or more processors 102 may control one or more transceivers 106 and/or one or more memories 104 to receive DCI and/or Data 1 and/or Data 2, and one or more transceivers 106 may receive, from the network side, DCI 1 and/or Data 1 and/or Data 2.

Likewise, the operation of the network side (100/200 in FIGS. 15 to 19) which transmits DCI and/or Data 1 and/or Data 2 to the UE (100/200 in FIGS. 15 to 19) in step S1210-1/S1210-2 described above may be implemented by the devices in FIGS. 15 to 19 to be described below. For example, referring to FIG. 16, one or more processors 102 may control one or more transceivers 106 and/or one or more memories 104 to transmit DCI and/or Data 1 and/or Data 2, and one or more transceivers 106 may transmit, to the UE, DCI and/or Data 1 and/or Data 2.

The UE may decode Data 1 (e.g., a first codeword) and Data 2 (e.g., a second codeword) received from the TRP 1 and the TRP 2 (S1215). For example, the UE may decode the Data 1/Data 2 based on the aforementioned proposal method (e.g., Proposal 1/2/3).

For example, the UE may check a layer to codeword mapping relation based on information configured/indicated through DCI, etc. as in the aforementioned method (e.g., Proposal 1/2/3). Specifically, the UE may perform a decoding operation by assuming a codeword(s)/DMRS port(s) mapped to a layer(s) through a table (e.g., Table 6, Table 7, Table 8) for a pre-defined/configured DMRS port configuration/indication.

For example, when an MCS field included in DCI corresponds to a 'reserved' MCS index and an NDI value corresponds to a value for indicating initial transmission, the UE may identify that a CW corresponding to the Data 1 and a CW corresponding to the Data 2 correspond to the same TB. That is, the UE may interpret that the CW corresponding to the Data 1 and the CW corresponding to the Data 2 have been transmitted from a TB of one higher layer.

For another example, when receiving DCI for which CRS scrambled using a specific RNTI (e.g., MCS-C-RNTI) is successful based on the aforementioned method (e.g., Proposal 1/2/3), the UE may identify that a CW corresponding to the Data 1 and a CW corresponding to the Data 2 correspond to the same TB and perform decoding or may identify that a CW corresponding to the Data 1 and a CW corresponding to the Data 2 have been branched from the same CW and perform decoding.

Furthermore, the UE may calculate the size of transport blocks corresponding to the Data 1 and the Data 2. For example, the UE may calculate the size of a TB by using TB information other than TB information including a configuration indicating that TBs are the same, based on information included in the DCI.

For example, the operation of the UE (e.g., reference numeral 100 and/or 200 of FIGS. 15 to 19) which decodes Data 1 and Data 2 in step S1215 described above may be implemented by the devices of FIGS. 15 to 19 to be described below. For example, referring to FIG. 16, one or more processors 102 may control one or more memories 104 to perform the operation of decoding Data 1 and Data 2.

The UE may transmit, to the network side, HARQ-ACK information (e.g., ACK information, NACK information, etc.) (e.g., first feedback information and/or second feedback information) for DCI and/or Data 1 and/or Data 2 through one or more PUCCH(s) through/using TRP 1 and/or TRP 2, based on the above-described method (e.g., Proposal Method 1/2/3, etc.) (S1220-1 and S1220-2). That is, the network side may receive, from the UE, HARQ-ACK information (e.g., ACK information, NACK information, etc.) (e.g., first feedback information and/or second feedback information) for DCI and/or Data 1 and/or Data 2 through/using TRP 1 and/or TRP 2, based on the above-described method (e.g., Proposal Method 1/2/3, etc.) (S1220-1 and S1220-2).

For example, HARQ-ACK information for Data 1 and/or Data 2 may be combined into one or separated depending on the number of codewords. Furthermore, the UE may be configured to transmit only HARQ-ACK information to a representative TRP (e.g., TRP 1), and HARQ-ACK information transmission to another TRP (e.g., TRP 2) may be omitted. For example, the UE may configure a HARQ-ACK codebook depending on a pre-define/configured rule based on Proposal 3, etc.

For example, the operation of the UE (100/200 in FIGS. 15 to 19) which transmits the HARQ-ACK information for Data 1 and/or Data 2 to the network side (100/200 in FIGS. 15 to 19) through one or more PUCCHs in step S1220-1/S1220-2 described above may be implemented by the devices in FIGS. 15 to 19 to be described below. For example, referring to FIG. 16, one or more processors 102 may control one or more transceivers 106 and/or one or more memories 104 to transmit the HARQ-ACK information for Data 1 and/or Data 2 through one or more PUCCHs, and one or more transceivers 106 may transmit, to the network side, the HARQ-ACK information for Data 1 and/or Data 2 through one or more PUCCHs.

Likewise, the operation of the network side (100/200 in FIGS. 15 to 19) which receives the HARQ-ACK information for Data 1 and/or Data 2 from the UE (100/200 in FIGS. 15 to 19) through one or more PUCCHs in step S1220-1/S1220-2 described above may be implemented by the devices in FIGS. 15 to 19 to be described below. For example, referring to FIG. 16, one or more processors 102 may control one or more transceivers 106 and/or one or more memories 104 to receive the HARQ-ACK information for Data 1 and/or Data 2, and one or more transceivers 106 may receive, from the UE, the HARQ-ACK information for Data 1 and/or Data 2 through one or more PUCCHs.

Although a single DCI-based M-TRP operation has been basically described with reference to FIG. 12, it may be applied to a multi-DCI-based M-TRP operation according to circumstances.

FIG. 13 illustrates an example of an operating flowchart of the data transmission and reception of a user equipment (UE) to which methods (e.g., Proposal 1/2/3) proposed in the present disclosure may be applied. The UE may be supported by a plurality of TRPs. Ideal/non-ideal backhaul may be configured between the plurality of TRPs. FIG. 13 is merely for convenience of description and does not limit the scope of the present disclosure. Furthermore, some step(s) illustrated in FIG. 13 may be omitted depending on a situation and/or a configuration.

In the following description, a "TRP" is basically described, but as described above, the "TRP" may be applied by being replaced with a panel, an antenna array, a cell (e.g., macro cell/small cell/pico cell), a transmission point (TP), a base station (gNB), etc. Furthermore, as described above, the TRP may be divided based on information (e.g., an index, an ID) for a CORESET group (or a CORESET pool). For example, if one UE has been configured to perform transmission and reception with multiple TRPs (or cells), this may mean that multiple CORESET groups (or CORESET pools) have been configured for one UE. A configuration for such a CORESET group (or CORESET pool) may be performed through higher layer signaling (e.g., RRC signaling).

The UE may receive control information (e.g., DCI) related to a first codeword and a second codeword (S1310).

The control information may be transmitted through a control channel (e.g., a PDCCH). The control information may include a TCI state, DMRS port indication information, codeword to layer mapping-related information, etc. Furthermore, the control information may include fields of a modulation and coding scheme (MCS), a new data indicator (NDI) and/or a redundancy version (RV). Furthermore, the control information may further include a field for indicating a value included in specific DMRS related information (e.g., DMRS port-related information).

For example, for DMRS port indication, DMRS port-related information having a table form may be pre-defined. The DMRS port-related information may be defined for 2-CW transmission in 4 or less layers. Alternatively, the DMRS port-related information may be defined for 1 CW transmission in 5 or more layers. The DMRS port-related information may be defined to have the required number of bits reduced compared to a DMRS table defined in a conventional standard. Alternatively, if a DMRS table defined in a conventional standard is used as DMRS port-related information, but transport blocks corresponding to two CWs are configured/identified to be the same, a UE and a base station may be agreed/configured that a value corresponding to 1 CW has been indicated.

For example, the control information may include cyclic redundancy check (CRC) scrambled by a specific radio network temporary identifier (RNTI). For example, the specific RNTI may be a modulation coding scheme cell RNTI (MCS-C-RNTI). Furthermore, the control information may include a plurality of TCI state(s). Codewords, that is, each of a first codeword and a second codeword, may correspond to different TCI state of a plurality of TCI states. In other words, a TCI state corresponding to the first codeword and a TCI state corresponding to the second codeword may be different.

Furthermore, the control information may include resource information for data (e.g., a first codeword, a second codeword). For example, the control information may include resource information of a first codeword (e.g., first data) and resource information of a second codeword (e.g., second data). Resource information of a second codeword (e.g., second data) may be indicated/configured based on resource information of a first codeword (e.g., first data). For example, the resource region of a second codeword may be indicated as an offset value of the index of a resource region of a first codeword. For example, the resource information may be configured/indicated using some bits of a conventional field for indicating a DMRS port (group).

For example, the control information may include information necessary to calculate the size of a transport block. If a first codeword and a second codeword are identified to correspond to the same transport block, based on which information the size of a transport block needs to be calculated may be indicated. For example, information (e.g., information necessary to calculate a transport block size) related to the size of a transport block may be indicated by using a part of the number of bits allocated to a field for indicating a value included in the specific DMRS related information.

For example, the operation of receiving control information by the UE (100/200 in FIGS. 15 to 19) in step S1310 may be implemented by an apparatus of FIGS. 15 to 19 to be described later. For example, referring to FIG. 16, one or more processors 102 may control one or more transceivers 106 and/or one or more memories 104 to receive the control information. The one or more transceivers 106 may receive the control information.

The UE may receive a first codeword (e.g., first data) and a second codeword (e.g., second data) based on the control information (S1320). For example, the first codeword and the second codeword may correspond to a codeword 0 and a codeword 1, respectively. The first codeword and the second codeword may be scheduled based on the control information. The first codeword and the second codeword may be received through a physical channel (e.g., a PDSCH)/physical layer. The UE may receive the first codeword and the second codeword through a DMRS port indicated based on DMRS port-related information.

For example, the first codeword and the second codeword may correspond to different TRPs, respectively. This may mean that codewords (i.e., the first codeword and the second codeword) correspond to different TCI states. Alternatively, it may be interpreted that codewords (i.e., the first codeword and the second codeword) correspond to DMRS port(s) of different (DMRS) CDM groups or different CDM group.

For example, it may be identified that the first codeword and the second codeword correspond to the same transport block in a physical channel/higher layer of a physical layer based on a pre-defined rule. In other words, it may be identified the first codeword and the second codeword may be encoded from the same transport block based on the pre-defined rule. The pre-defined rule may be based on the aforementioned proposal methods (e.g., Proposal 1/2/3).

For example, the pre-defined rule may be related to a specific radio network temporary identifier (RNTI). If the control information received in step S1310 includes CRS scrambled by the specific RNTI, it may be identified that the first codeword and the second codeword correspond to the same transport block. For example, the specific RNTI may be a modulation coding scheme cell RNTI (MCS-C-RNTI).

For another example, the pre-defined rule may be related to the number of TCI states included in the control information. For example, if the control information includes a plurality of TCI states, it may be identified that the first codeword and the second codeword correspond to the same transport block. For example, the first codeword and the second codeword may correspond to different TCI states, respectively.

For another example, the pre-defined rule may be determined based on a combination of at least two of an MCS, an NDI or an RV included in the control information received in step S1310. For example, if a value of the MCS is a value related to the retransmission of data and the NDI corresponds to a value related to the initial transmission of the data, it may be identified that the first codeword and the second codeword correspond to the same transport block. For example, at least one of an modulation order or RV of the first codeword and the second codeword may be differently applied.

For example, based on the identification that the first codeword and the second codeword correspond to the same transport block, specific DMRS related information may be used to receive data (e.g., the first codeword, the second codeword). For example, the specific DMRS related information may include an association relationship between 4 or less layers and the first codeword and the second codeword.

Furthermore, the UE may calculate the size of a transport block. For example, the UE may calculate the size of a transport block based on an MCS, an RV or the number of layers included in the control information. The size of a transport block may be calculated based on a parameter not related to a parameter in which the same transport block is indicated/configured. As a detailed example, if a value of an MCS for a first codeword includes a value related to the retransmission of data and an NDI corresponds to a value related to the initial transmission of the data, the size of a transport block may be calculated based on an MCS, an RV or the number of layers for the second codeword. For another example, based on which information the size of a transport block needs to be calculated may be indicated by the control information. The size of a transport block may be calculated based on the information.

Although it is identified that a first codeword and a second codeword are included in the same transport block as described above, at least one of a modulation order or an RV applied to each codeword may be differently configured/applied. For example, although the sizes of transport blocks calculated based on a configuration of a base station or a combination of an MCS and an NDI are the same, modulation orders or RVs of a first codeword and a second codeword may be differently configured.

For example, the operation of receiving a first codeword and a second codeword by the UE (100/200 in FIGS. 15 to 19) in step S1320 may be implemented the apparatus of FIGS. 15 to 19 to be described later. For example, referring to FIG. 16, the one or more processors 102 may control the one or more transceivers 106 and/or the one or more memories 104 to receive the first codeword and the second codeword. The one or more transceivers 106 may receive the first codeword and the second codeword.

The UE may transmit feedback information for the first codeword and the second codeword (S1330). For example, the feedback information may be HARQ-ACK information (e.g., ACK/NACK) for control information and/or data (i.e., the first codeword and the second codeword). The feedback information may be transmitted through an uplink channel (e.g., a PUCCH).

For example, when it is identified that the first codeword and the second codeword correspond to the same transport block based on Proposal 3, etc., a UE may transmit ACK although the reception of at least one of the first codeword and the second codeword is successful. Furthermore, feedback information for the first codeword and feedback information for the second codeword may be combined into one and transmitted. For example, the feedback information (e.g., HARQ-ACK information) for the first codeword and the second codeword may include 1 bit.

For example, the operation of transmitting the feedback information by the UE (100/200 in FIGS. 15 to 19) in step S1330 may be implemented by the apparatus of FIGS. 15 to 19 to be described later. For example, referring to FIG. 16, the one or more processors 102 may control the one or more transceivers 106 and/or the one or more memories 104 to transmit the feedback information. The one or more transceivers 106 may transmit the feedback information.

FIG. 14 illustrates an example of an operating flowchart of the data transmission and reception of a base station (BS) to which methods (e.g., Proposal 1/2/3) proposed in the present disclosure may be applied.

The base station may collectively mean an object that performs the transmission and reception of data with a UE. For example, the base station may be a concept including one or more transmission points (TPs), one or more transmission and reception points (TRPs), etc. Furthermore, the TP and/or the TRP may include a panel, a transmission and reception unit, etc. of the base station. Furthermore, as described above, the TRP may be divided based on information (e.g., an index, an ID) for a CORESET group (or CORESET pool). For example, if one UE has been configured to perform transmission and reception with multiple TRPs (or cells), this may mean that multiple CORESET groups (or CORESET pools) have been configured for the one UE. A configuration for such a CORESET group (or CORESET pool) may be performed through higher layer signaling (e.g., RRC signaling). FIG. 14 is merely for convenience of description and does not limit the scope of the present disclosure. Furthermore, some step(s) illustrated in FIG. 14 may be omitted depending on a situation and/or a configuration.

The base station (BS) may transmit, to a UE, control information (e.g., DCI) related to a first codeword and a second codeword (S1410). The control information may be transmitted through a control channel (e.g., a PDCCH). For example, the control information may include a TCI state, a codeword to layer mapping-related information, a field for indicating a value included in specific DMRS related information (e.g., DMRS port-related information), information necessary to calculate the size of a transport block, etc.

For example, in order to configure/indicate that codewords to be transmitted in a subsequent step correspond to the same transport block, a base station may transmit the control information based on a pre-defined rule. As a detailed example, the base station may transmit the control information by attaching CRS scrambled by a specific RNTI to the control information. For example, the specific RNTI may be an MCS-C-RNTI. Furthermore, the control information may include a plurality of TCI states. It may be identified that a first codeword and a second codeword transmitted in a subsequent step correspond to the same transport block based on the specific RNTI.

For another example, the control information may include fields of a modulation and coding scheme (MCS), a new data indicator (NCI) and/or a redundancy version (RV). For example, the base station may configure/indicate that codewords to be transmitted in a subsequent step correspond to the same transport block based on a combination of at least two of the MCS, NDI or RV. For example, the base station may configure/indicate that a value of the MCS is a value related to the retransmission of data and the NDI corresponds to a value related to the initial transmission of the data. It may be identified that a first codeword and a second codeword transmitted in a subsequent step correspond to the same transport block based on the configuration/indication. At least one of a modulation order or RV of the first codeword and the second codeword may be differently applied.

Furthermore, the control information may include resource information for data (e.g., a first codeword, a second codeword). For example, the control information may include resource information of a first codeword (e.g., first data) and resource information of a second codeword (e.g., second data). Resource information of a second codeword (e.g., second data) may be indicated/configured based on resource information of a first codeword (e.g., first data). For example, the resource region of a second codeword may be indicated as an offset value of the index of the resource region of a first codeword.

The operation in step S1410 may correspond to the UE operation in step S1310, and thus a redundant description thereof is omitted hereinafter.

For example, the operation of transmitting the control information by the base station (100/200 in FIGS. 15 to 19) in step S1410 may be implemented by the apparatus of FIGS. 15 to 19 to be described later. For example, referring to FIG. 16, the one or more processors 102 may control the one or more transceivers 106 and/or the one or more memories 104 to transmit the control information. The one or more transceivers 106 may transmit the control information to the UE.

The base station may transmit a first codeword (e.g., first data) and a second codeword (e.g., second data) to the UE (S1420). The first codeword and the second codeword may be scheduled based on the control information. The first codeword and the second codeword may be transmitted through a physical channel (e.g., a PDSCH). For example, the first codeword and the second codeword may be mapped to a layer based on the aforementioned proposal method (e.g., Proposal 1/2/3) and transmitted. Furthermore, the first codeword and the second codeword may be transmitted based on a DMRS port-related configuration/indication of the aforementioned proposal method (e.g., Proposal 1/2/3). For example, the first codeword and the second codeword may be transmitted in 4 or less layers.

The operation in step S1420 may correspond to the UE operation in step S1320, and thus a redundant description thereof is omitted hereinafter.

For example, the operation of transmitting, to the UE, the first codeword and the second codeword by the base station (100/200 in FIGS. 15 to 19) in step S1420 may be implemented by the apparatus of FIGS. 15 to 19 to be described later. For example, referring to FIG. 16, the one or more processors 102 may control the one or more transceivers 106 and/or the one or more memories 104 to transmit the first codeword and the second codeword. The one or more transceivers 106 may transmit the first codeword and the second codeword to the UE.

The base station may receive feedback information for the first codeword and the second codeword from the UE (S1430). The feedback information may be HARQ-ACK information (e.g., ACK/NACK) for control information and/or data (i.e., the first codeword and the second codeword). The feedback information may be transmitted through an uplink channel (e.g., a PUCCH).

For example, if it is identified that the first codeword and the second codeword correspond to the same transport block based on Proposal 3, etc., feedback information for the first codeword and feedback information for the second codeword may be combined into one and received. For example, the feedback information for the first codeword and the second codeword (e.g., HARQ-ACK information) may include 1 bit.

The operation in step S1430 may correspond to the UE operation in step S1330, and thus a redundant description thereof is omitted hereinafter.

For example, the operation of transmitting the feedback information by the UE (100/200 in FIGS. 15 to 19) in step S1430 may be implemented by the apparatus of FIGS. 15 to 19 to be described later. For example, referring to FIG. 16, the one or more processors 102 may control the one or more transceivers 106 and/or the one or more memories 104 to receive the feedback information. The one or more transceivers 106 may receive the feedback information.

As mentioned above, the network side/UE signaling and operation (e.g., Proposal Method 1/2/3, FIGS. 12/13/14, etc.) may be implemented by devices (e.g., FIGS. 15 to 19) to be described below. For example, the network side (e.g., TRP 1/TRP 2) may correspond to a first wireless device and the UE may correspond to a second wireless device and in some cases, an opposite case thereto may also be considered. For example, the first device (e.g., TRP 1)/second device (e.g., TRP 2) may correspond to the first wireless device and the UE may correspond to the second wireless device and in some cases, an opposite case thereto may also be considered.

For example, the network side/UE signaling/operation (e.g., Proposal 1/2/3/FIGS. 12/13/14, etc.) may be processed by one or more processors (e.g., 102 and 202) in FIGS. 15 to 19 and the network side/UE signaling and operation (e.g., Proposal 1/2/3/FIGS. 12/13/14, etc.) may be stored in a memory (e.g., one or more memories (e.g., 104 and 204) in the form of a command/program (e.g., instruction and executable code) for driving at least one processor (e.g., 102 and 202) in FIGS. 15 to 19.

Communication System Applied to the Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 15 illustrates a communication system applied to the disclosure.

Referring to FIG. 15, a communication system (1) applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., Relay, Integrated Access Backhaul (IAB)). The wireless devices and the BSs/wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Devices Applicable to the Disclosure

FIG. 16 illustrates wireless devices applicable to the disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 15.

The first wireless device 100 may include one or more processors 102 and one or more memories 104 and additionally further include one or more transceivers 106 and/or one or morentennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or morentennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include at least one processor 202 and at least one memory 204 and additionally further include at least one transceiver 206 and/or one or morentennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or morentennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or morentennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or morentennas 108 and 208. In this document, the one or morentennas may be a plurality of physical antennas or a plurality of logical antennas (e.g., antenna ports). The one or more transceivers 106 and 206 may convert received radio signals/channels, etc. from RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which Disclosure is Applied

FIG. 17 illustrates a signal processing circuit for a transmit signal.

Referring to FIG. 17, a signal processing circuit 1000 may include a scrambler 1010, a modulator 1020, a layer mapper 1030, a precoder 1040, a resource mapper 1050, and a signal generator 1060. Although not limited thereto, an operation/function of FIG. 17 may be performed by the processors 102 and 202 and/or the transceivers 106 and 206 of FIG. 16. Hardware elements of FIG. 17 may be implemented in the processors 102 and 202 and/or the transceivers 106 and 206 of FIG. 16. For example, blocks 1010 to 1060 may be implemented in the processors 102 and 202 of FIG. 16. Further, blocks 1010 to 1050 may be implemented in the processors 102 and 202 of FIG. 16 and the block 1060 of FIG. 16 and the block 1060 may be implemented in the transceivers 106 and 206 of FIG. 16.

A codeword may be transformed into a radio signal via the signal processing circuit 1000 of FIG. 17. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-BPSK (pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (1010 to 1060) of FIG. 17. For example, the wireless device (e.g., 100 or 200 of FIG. 16) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Disclosure

FIG. 18 illustrates another example of a wireless device applied to the disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 16. For example, the transceiver(s) 114 may include the one or more transceivers 106 and 106 and/or the one or morentennas 108 and 108 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* in FIG. 15), the vehicles (100*b*-1 and 100*b*-2 in FIG. 15), the XR device (100*c* in FIG. 15), the hand-held device (100*d* in FIG. 15), the home appliance (100*e* in FIG. 15), the IoT device (100*f* in FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof Portable Device Example to which Disclosure is Applied FIG. 19 illustrates a portable device applied to the disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 19, a portable device 100 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. The blocks 110 to 130/140*a* to 140*c* correspond to the blocks 110 to 130/140 of FIG. 18, respectively.

The communication unit 110 may transmit/receive a signal (e.g., data, a control signal, etc.) to/from another wireless device and eNBs. The control unit 120 may perform various operations by controlling components of the portable device 100. The control unit 120 may include an Application Processor (AP). The memory unit 130 may store data/parameters/programs/codes/instructions required for driving the portable device 100. Further, the memory unit 130 may store input/output data/information, etc. The power supply unit 140*a* may supply power to the portable device 100 and include a wired/wireless charging circuit, a battery, and the like. The interface unit 140*b* may support a connection between the portable device 100 and another external device. The interface unit 140*b* may include various ports (e.g., an audio input/output port, a video input/output port) for the connection with the external device. The input/output unit 140*c* may receive or output a video information/signal, an audio information/signal, data, and/or information input from a user. The input/output unit 140*c* may include a camera, a microphone, a user input unit, a display unit 140*d*, a speaker, and/or a haptic module.

As one example, in the case of data communication, the input/output unit 140*c* may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140*c*.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or morepplication specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL AVAILABILITY

Although the method of transmitting and receiving data in the wireless communication system of the present disclosure has been described in connection with examples in which it applies to 3GPP LTE/LTE-A system and 5G systems (new RAT systems), the method is also applicable to other various wireless communication systems.

The invention claimed is:

1. A method of receiving data by a user equipment (UE) in a wireless communication system, the method comprising:
   receiving from a first base station, control information related to a first codeword and a second codeword;
   receiving, from the first base station, the first codeword based on at least one first layer of a first number; and
   receiving, from a second base station, the second codeword based on at least one second layer of a second number,
   wherein based on a pre-defined rule, it is identified that the first codeword and the second codeword correspond to a same transport block in a higher layer of a physical layer,
   wherein, in case the first number and the second number are different, a size of the transport block is determined based on one of the first number or the second number based on a field of the control information.

2. The method of claim 1,
   wherein the pre-defined rule is related to a specific Radio Network Temporary Identifier (RNTI), and
   wherein when the control information includes a cyclic redundancy check (CRC) scrambled by the specific RNTI, the correspondence to the same transport block is identified.

3. The method of claim 2,
   wherein the specific RNTI is a modulation coding scheme cell RNTI (MCS-C-RNTI).

4. The method of claim 1,
   wherein the control information includes fields of a modulation coding scheme (MCS), a New Data Indicator (NDI) and a Redundancy Version (RV), and
   wherein the pre-defined rule is determined based on a combination of at least two of the MCS, NDI or RV.

5. The method of claim 4,
   wherein when a value of the MCS is a value related to retransmission of the data, and the NDI corresponds to a value related to initial transmission of the data, the correspondence to the same transport block is identified.

6. The method of claim 5,
   wherein at least one of an modulation order or the RV of the first codeword and the second codeword is applied differently.

7. The method of claim 1,
   wherein when the control information includes a plurality of Transmission Configuration Indicator (TCI) states, the correspondence to the same transport block is identified.

8. The method of claim 7,
   wherein each of the first codeword and the second codeword corresponds to a different TCI state among the plurality of TCI states.

9. The method of claim 1, further comprising:
   transmitting feedback information for the first codeword and the second codeword,
   wherein the feedback information comprises 1 bit.

10. The method of claim 1,
    wherein the control information includes resource information of the first codeword and resource information of the second codeword, and
    wherein the resource information of the second codeword is configured based on the resource information of the first codeword.

11. The method of claim 1,
    wherein based on identification that the first codeword and the second codeword correspond to the same transport block, specific DMRS related information is used for data reception.

12. The method of claim 11,
    wherein the specific DMRS related information includes an association relationship between 4 or less layers and the first codeword and the second codeword.

13. The method of claim 11,
    wherein the control information further includes a field for indicating a value included in the specific DMRS related information.

14. The method of claim 13,
    wherein information related to a size of the transport block is indicated using a part of a number of bits allocated to the field for indicating the value included in the specific DMRS related information.

15. A user equipment (UE) for transmitting and receiving data in a wireless communication system, the UE comprising:
    one or more transceivers;
    one or more processors; and
    one or more memories storing instructions for operations executed by the one or more processors and connected to the one or more processors,
    wherein the operations comprise:
    receiving, from a first base station, control information related to a first codeword and a second codeword; and
    receiving, from the first base station, the first codeword based on at least one first layer of a first number; and
    receiving, from a second base station, the second codeword based on at least one second layer of a second number,
    wherein based on a pre-defined rule, the UE identifies that the first codeword and the second codeword correspond to a same transport block in a higher layer of a physical layer,
    wherein, in case the first number and the second number are different, a size of the transport block is determined based on one of the first number or the second number based on a field of the control information.

16. A base station (BS) for transmitting and receiving data in a wireless communication system, the BS comprising:
    one or more transceivers;
    one or more processors; and
    one or more memories storing instructions for operations executed by the one or more processors and connected to the one or more processors,
    wherein the operations comprise:
    transmitting, to a user equipment (UE), control information related to a first codeword and a second codeword; and
    transmitting, to the UE, the first codeword based on at least one first layer of a first number, wherein the second codeword is transmitted to the UE from another BS based on based on at least one second layer of a second number,
    wherein the control information is configured that the UE identifies that the first codeword and the second codeword correspond to a same transport block transmitted from a higher layer of a physical layer, wherein, in case the first number and the second number are different, a size of the transport block is determined based on one of the first number or the second number based on a field of the control information.

* * * * *